United States Patent
Hwang et al.

(10) Patent No.: US 9,450,714 B2
(45) Date of Patent: Sep. 20, 2016

(54) METHOD AND DEVICE FOR TRANSMITTING UPLINK CONTROL INFORMATION

(71) Applicant: LG Electronics Inc., Seoul (KR)

(72) Inventors: Daesung Hwang, Anyang-si (KR);
Suckchel Yang, Anyang-si (KR);
Joonkui Ahn, Anyang-si (KR);
Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 24 days.

(21) Appl. No.: 14/396,322

(22) PCT Filed: Apr. 23, 2013

(86) PCT No.: PCT/KR2013/003450
§ 371 (c)(1),
(2) Date: Oct. 22, 2014

(87) PCT Pub. No.: WO2013/162247
PCT Pub. Date: Oct. 31, 2013

(65) Prior Publication Data
US 2015/0110029 A1    Apr. 23, 2015

Related U.S. Application Data

(60) Provisional application No. 61/637,827, filed on Apr. 24, 2012, provisional application No. 61/644,437, filed on May 9, 2012, provisional application No. 61/678,632, filed on Aug. 2, 2012.

(51) Int. Cl.
*H04L 1/18*   (2006.01)
*H04L 1/00*   (2006.01)
*H04L 1/16*   (2006.01)

(52) U.S. Cl.
CPC .......... *H04L 1/1893* (2013.01); *H04L 1/0026* (2013.01); *H04L 1/0031* (2013.01); *H04L 1/1671* (2013.01); *H04L 1/1861* (2013.01)

(58) Field of Classification Search
None
See application file for complete search history.

(56) References Cited

U.S. PATENT DOCUMENTS

2011/0249578 A1* 10/2011 Nayeb Nazar ........ H04L 1/0027
                                                                    370/252
2012/0033587 A1*  2/2012 Papasakellariou ...... H04J 13/00
                                                                    370/277

(Continued)

OTHER PUBLICATIONS

Texas Instruments, "Multiplexing Periodic CSI and HARQ-ACK on PUCCH", R1-121204, 3GPP TSG RAN WG1 Meeting #68bis, Jeju, Korea, Mar. 26-30, 2012, 4 pages.

(Continued)

*Primary Examiner* — Mohammad Adhami
(74) *Attorney, Agent, or Firm* — Dentons US LLP

(57) ABSTRACT

A method of transmitting uplink control information in a wireless communication system is provided. The method may include: determining whether to simultaneously transmit a hybrid automatic repeat request (HARQ) ACK/NACK and channel state information (CSI) from a sub frame; generating an added HARQ ACK/NACK by adding additional bits having a number of bits corresponding to the number of bits of the CSI to the bits of the HARQ ACK/NACK if it is determined that simultaneous transmission is performed; generating an encoded HARQ ACK/NACK by encoding the added HARQ ACK/NACK; generating a plurality of modulation symbols by modulating the encoded HARQ ACK/NACK; and transmitting the plurality of modulation symbols from the sub frame to an uplink control channel.

13 Claims, 15 Drawing Sheets

(56) References Cited

U.S. PATENT DOCUMENTS

| | | | |
|---|---|---|---|
| 2012/0113907 A1* | 5/2012 | Baldemair | H04W 52/146 370/329 |
| 2013/0208665 A1* | 8/2013 | Baldemair | H04L 1/0031 370/329 |

OTHER PUBLICATIONS

Ericsson, et al., "Multiplexing periodic CSI with CA A/N based on PUCH Format 3", R1-121011, 3GPP TSG RAN WG1 Meeting #68bis, Jeju, Korea, Mar. 26-30, 2012, 3 pages.

NTT DOCOMO, "UL Control Signaling Enhancements for Rel-11 CA Scenarios", R1-120397, 3GPP TSG RAN WG1 Meeting #68, Dresden, Germany, Feb. 6-10, 2012, 4 pages.

LG Electronics, "Simulation results for joint coding and separate coding for multiplexing HARQ-ACK and CSI on PUCCH format 3", R1-121417, 3GPP TSG RAN WG1 Meeting #68bis, Jeju, Korea, Mar. 26-30, 2012, 7 pages.

New Postcom, "Periodic CSI issues on uplink control signalling enhancement", R1-121343, 3GPP TSG RAN WG1 Meeting #68bis, Jeju, Korea, Mar. 26-30, 2012, 7 pages.

\* cited by examiner

METHOD AND DEVICE FOR TRANSMITTING UPLINK CONTROL INFORMATION

This Application is a 35 U.S.C. §371 National Stage entry of International Application No. PCT/KR2013/003450, filed Apr. 23, 2013, which claims benefit of Provisional Application Nos. 61/637,827 filed Apr. 24, 2012; 61/644,437 filed May 9, 2012 and 61/678,632 filed Aug. 2, 2012, all of which are incorporated by reference in their entirety herein.

BACKGROUND OF THE INVENTION

1. Field of the Invention

The present invention relates to wireless communication, and more particularly, to a method and a device for transmitting uplink control information.

2. Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

As disclosed in 3GPP TS 36.211 V10.4.0 (2011 December) "Evolved Universal Terrestrial Radio Access (E-UTRA); Physical Channels and Modulation (Release 10)", in LTE, physical channels may be divided into a PDSCH (Physical Downlink Shared Channel) and a PDCCH (Physical Downlink Control Channel) which are downlink channels, and a PUSCH (Physical Uplink Shared Channel) and a PUCCH (Physical Uplink Control Channel) which are uplink channels.

The uplink channels are used in transmission of various uplink control information such as HARQ (hybrid automatic repeat request) ACK/NACK, CS (Channel State Information), and SR (scheduling request).

Radio resources for the uplink channels are more limited than radio resources for the downlink channels, a transmission error of the uplink control information may degrade service quality, and as a result, the design of the uplink channels needs to consider the transmission error

SUMMARY OF THE INVENTION

The present invention provides a method and a device for transmitting uplink control information.

An exemplary embodiment of the present invention provides a method for transmitting uplink control information in a wireless communication system. The method may comprise: determining whether a hybrid automatic repeat request (HARQ) ACK/NACK and channel state information (CSI) are simultaneously transmitted in a subframe; when the simultaneous transmission is determined, generating HARQ ACK/NACK bits into which additional bits having the bit number corresponding to the number of the CSI bits are added; generating an encoded HARQ ACK/NACK by encoding the HARQ ACK/NACK bits; generating a plurality of modulation symbols by modulating the encoded HARQ ACK/NACK; and transmitting the plurality of modulation symbols to an uplink control channel in the subframe.

In another embodiment, there is provided a wireless device for transmitting uplink control information in a wireless communication system. The device may comprise: a radio frequency (RF) unit which transmits or receives a radio signal; and a processor connected with the RF unit.

The processor may determine whether a hybrid automatic repeat request (HARQ) ACK/NACK and CSI are simultaneously transmitted in a subframe; when the simultaneous transmission is determined, generate HARQ ACK/NACK bits into which additional bits having the bit number corresponding to the number of the CSI bits are added; generate an encoded HARQ ACK/NACK by encoding the HARQ ACK/NACK bits; generate a plurality of modulation symbols by modulating the encoded HARQ ACK/NACK; and transmit, through the RF unit, the plurality of modulation symbols to an uplink control channel in the subframe.

The method may further comprise: receiving downlink control information (DCI) having uplink resource allocation; and transmitting the CSI on an uplink shared channel by using the uplink resource allocation in the subframe.

The generating of the encoded HARQ ACK/NACK may include: generating the encoded HARQ ACK/NACK based on single RM when the number of the HARQ ACK/NACK bits is equal to or smaller than 11 bits; and generating the encoded HARQ ACK/NACK based on dual RM when the number of the HARQ ACK/NACK bits is larger than 11 bits.

The modulation may use quadrature phase shift keying (QPSK).

The additional bits may include at least one of '1' or '0'.

The uplink channel may a physical uplink control channel (PUCCH).

The transmission on the uplink channel may use a PUCCH format 3.

The uplink shared channel may be a physical uplink shared channel (PUSCH).

The HARQ ACK/NACK may for a plurality of cells for carrier aggregation.

The CSI may be for a plurality of cells for carrier aggregation.

According to the exemplary embodiment of the present invention, it is possible to transmit various kinds and an increased amount of uplink control information, while using a structure of an uplink channel in the related art.

DESCRIPTION OF EXEMPLARY EMBODIMENTS

A wireless device may be fixed or have mobility, and may be called as other terms such as user equipment (UE), a mobile station (MS), a user terminal (UT), a subscriber station (SS), and a mobile terminal (MT). A base station generally represents a fixed station that communicates with the wireless device, and may be called other terms such as an evolved-NodeB (eNB), a base transceiver system (BTS), an access point, and the like.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The wireless device may be served by a plurality of serving cells. Each serving cell may be defined as a downlink (DL) component carrier (CC) or a pair of the DL CC and an uplink (UP) CC.

The serving cell may be divided into a primary cell and a secondary cell. The primary cell is a cell which operates at a primary frequency, and performs an initial connection establishment process, starts a connection reestablishment process, or is designated as the primary cell during a handover process. The primary cell is also referred to as a reference cell. The secondary cell operates at a secondary frequency, may be set after an RRC (Radio Resource Control) connection is established, and may be used to provide an additional radio resource. At least one primary cell may be continuously set, and the secondary cell may be add/modified/cancelled by higher layer signaling (e.g., an RRC message).

A cell index (CI) of the primary cell may be fixed. For example, a lowest CI may be designated as the CI of the primary cell. Hereinafter, the CI of the primary cell is 0, and CIs of the secondary cell are sequentially allocated from 1.

Figure 1:
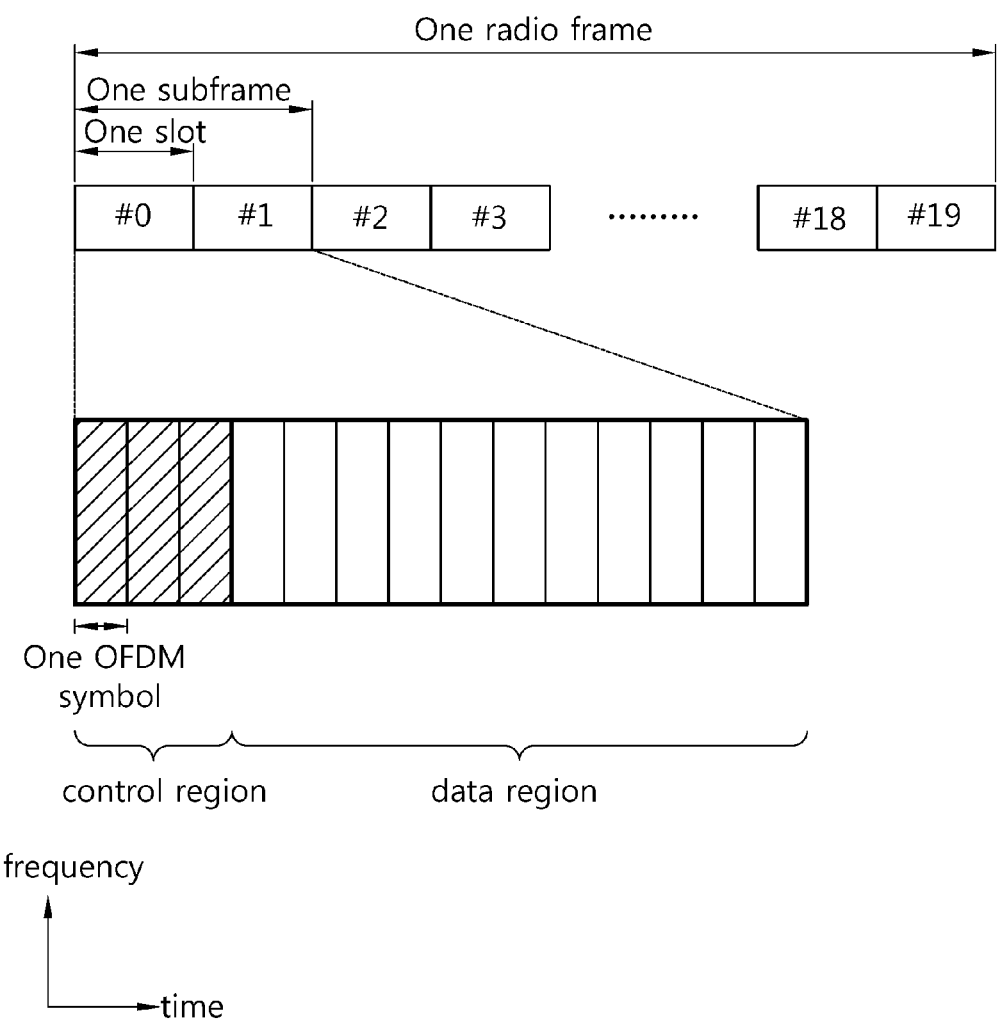
FIG. 1 illustrates a structure of a DL radio frame in 3GPP LTE.

FIG. 1 illustrates a structure of a radio frame in 3GPP LTE.

This may refer to a chapter 4 of 3GPP TS 36.211 V10.4.0 (2011 December) "Evolved Universal Terrestrial Radio Access (E-UTRA); Physical Channels and Modulation (Release 10)".

The radio frame includes 10 subframes in which indexes of 0 to 9 are set. One subframe includes two contiguous slots. A time taken to transmit one subframe is called a transmission time interval (TTI), and for example, a length of one subframe is 1 ms, and a length of one slot may be 0.5 ms.

One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is just to express one symbol period in the time domain, and is not limited to a multiple access method or a name. For example, the OFDM symbol may be referred to as other names such as a single carrier-frequency division multiple access (SC-FDMA) symbol and a symbol period.

An example in which one slot includes 7 OFDM symbols is described, but the number of OFDM symbols included in one slot may vary according to a length of a cyclic prefix (CP). According to 3GPP TS 36.211 V10.4.0, in a normal CP, one slot includes 7 OFDM symbols, and in an extended CP, one slot includes 6 OFDM symbols.

A resource block (RB) includes a plurality of subcarriers in one slot as a resource allocation unit. For example, when one slot includes 7 OFDM symbols in the time domain and the RB includes 12 subcarriers in a frequency domain, one RB may include 7×12 resource elements (REs).

The downlink (DL) subframe is divided into a control region and a data region in the time domain. The control region includes maximum three precedent OFDM symbols of a first slot in the subframe, but the number of OFDM symbols included in the control region may be changed. A physical downlink control channel (PDCCH) and other control channels are allocated to the control region, and a PDSCH is allocated to the data region.

As disclosed in 3GPP TS 36.211 V8.7.0, a physical channel in 3GPP LTE may be divided into the physical downlink shared channel (PDSCH) and a physical uplink shared channel (PUSCH) which are data channels, and a physical downlink control channel (PDCCH), a physical control format indicator channel (PCFICH), a physical hybrid-ARQ indicator channel (PHICH), and a physical uplink control channel (PUCCH) which are control channels.

The PCFICH transmitted in a first OFDM symbol of the subframe transmits a control format indicator regarding the number (that is, the size of the control region) of OFDM symbols used to transmit control channels in the subframe. The wireless device first receives the CFI on the PCFICH and thereafter, monitors the PDCCH.

Unlike the PDCCH, the PCFICH is transmitted through a fixed PCFICH resource of the subframe without using blind decoding.

The PHICH transmits a positive-acknowledgment (ACK)/negative-acknowledgement (NACK) signal for an UL hybrid automatic repeat request (HARM). The ACK/NACK signal for uplink (UL) data on the PUSCH transmitted by the wireless device is transmitted to the PHICH.

A physical broadcast channel (PBCH) is transmitted in four precedent OFDM symbols of a second slot of the first subframe of the radio frame. The PBCH transmits system information required for the wireless device to communicate with the base station, and the system information transmitted through the PBCH is called a master information block (MIB). As compared therewith, system information transmitted to the PDSCH instructed by the PDCCH is called a system information block (SIB).

Control information transmitted through the PDCCH is called downlink control information (DCI). The DCI may include resource allocation (also referred to as downlink (DL) grant) of the PDSCH, resource allocation (also referred to as uplink (UL) grant) of the PUSCH, a set of transmission power control commands for individual UEs in a predetermined UE group, and/or activation of a voice over Internet protocol (VoIP).

In 3GPP LTE, the UE uses blind decoding in order to detect the PDCCH data. The blind decoding is a scheme that demasks a desired identifier to a CRC of a received PDCCH (referred to as a PDCCH candidate) and checks a CRC error to check whether the corresponding PDCCH is a control channel thereof. The base station determines a PDCCH format according to a DCI to be transmitted to the wireless device and then adds the CRS to the DCI, and masks a unique identifier (referred to as a radio network temporary identifier (RNTI)) to the CRS according to an owner or a usage of the PDCCH.

According to 3GPP TS 36.211 V10.4.0, the UL channel includes a PUSCH, a PUCCH, a sounding reference signal (SRS), and a physical random access channel (PRACH).

Figure 2:
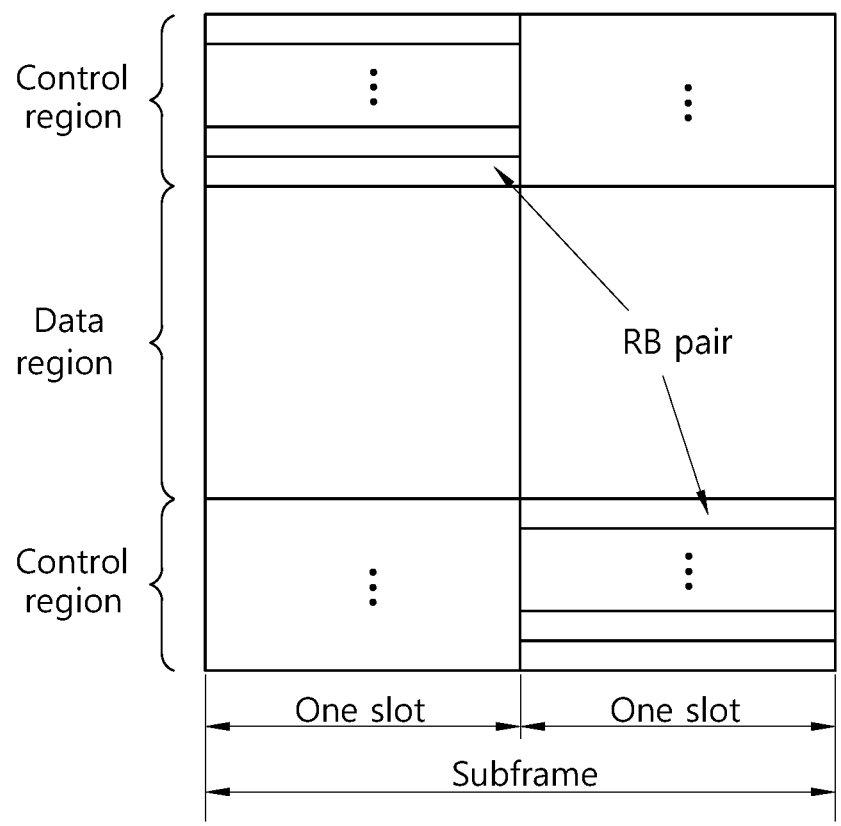
FIG. 2 illustrates a structure of a UL subframe structure in 3GPP LTE.

FIG. 2 shows a structure of a UL subframe in 3GPP LTE.

Referring to FIG. 2, the UL subframe may be divided into a control region and a data region in the frequency domain. A physical uplink control channel (PUCCH) for transmitting the uplink control information is allocated to the control region. A physical uplink shared channel (PUSCH) for transmitting data (in some cases, control information may be transmitted together) is allocated to the data region.

A PUCCH for one UE is allocated to a resource block (RB) pair in the subframe. The RBs that belong to the pair of RBs occupy different subcarriers in first and second slots, respectively. A frequency occupied by the resource blocks that belongs to the RB pair allocated to the PUCCH is changed based on a slot boundary. This means that the RB pair allocated to the PUCCH is frequency-hopped on the slot boundary. The UE transmits the uplink control information through different subcarriers with time to acquire a frequency diversity gain.

Hereinafter, a carrier aggregation system will be described.

Figure 3:
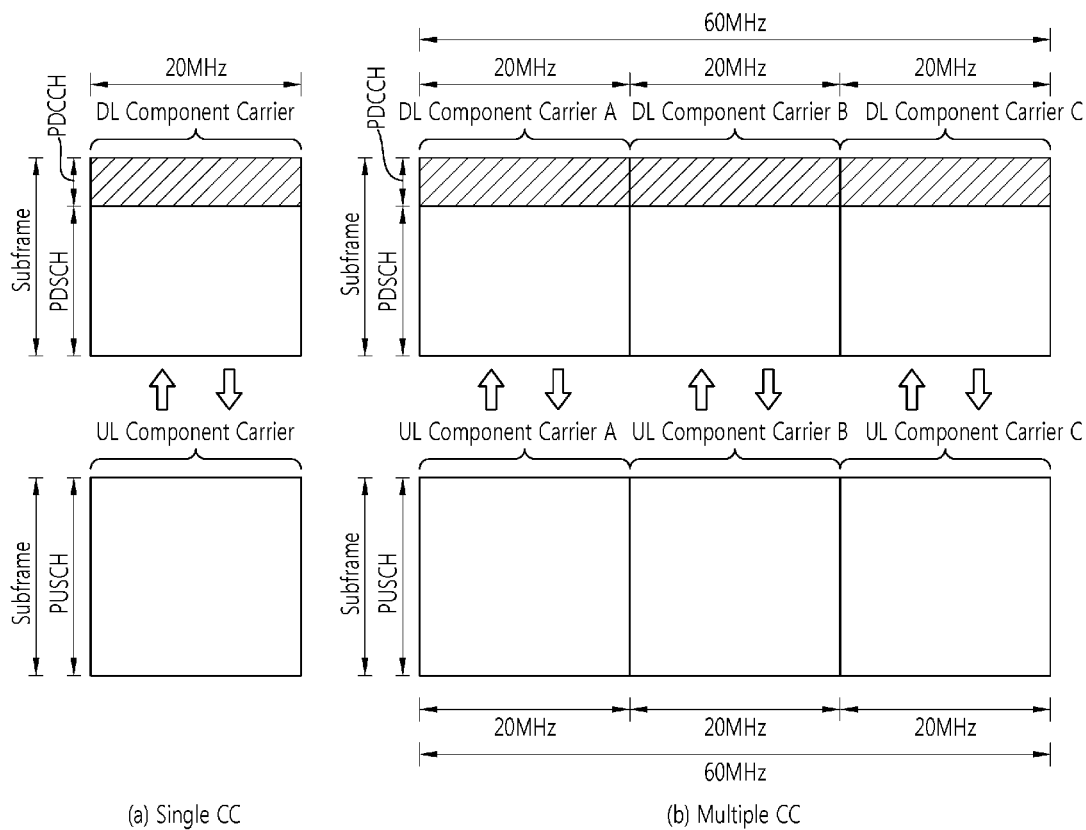
FIG. 3 illustrates a Comparative Example of a single carrier system and a carrier aggregation system in the related art.

FIG. 3 illustrates a comparative example of a single carrier system in the related art and a carrier aggregation system.

Referring to FIG. 3, the single carrier system supports only one carrier to the UE in the uplink and the downlink. A bandwidth of the carrier may be diversified, but one carrier is allocated to the UE. On the contrary, in the carrier aggregation (CA) system, a plurality of component carriers DL CCs A to C and UL CCs A to C may be allocated to the UE. A component carrier (CC) means a carrier used in the CA system and may be abbreviated as a carrier. For example, in order to allocate a bandwidth of 60 MHz to the UE, three 20-MHz component carriers may be allocated.

The CA system may be divided into a contiguous carrier aggregation system in which carriers to be aggregated are contiguous and a non-contiguous carrier aggregation system in which the carriers to be aggregated are separated from each other. Hereinafter, when simply referred to as the CA system, it should be understood that the CA system includes both the system in which the component carriers are contiguous and the system in which the component carriers are not contiguous.

Component carriers to be targeted when one or more component carriers are aggregated may just use a bandwidth used in the existing system for backward compatibility with the existing system. For example, in a 3GPP LTE system, bandwidths of 1.4 MHz, 3 MHz, 5 MHz, 10 MHz, 15 MHz, and 20 MHz are supported, and in a 3GPP LTE-A system, a wide band of 20 MHz or more may be configured by using only the bandwidth of the 3GPP LTE system. Alternatively, the wideband may be configured by defining a new bandwidth without using the bandwidth of the existing system as it is.

A system frequency band of the wireless communication system is divided into a plurality of carrier frequencies. Here, the carrier-frequency means a center frequency of a cell. Hereinafter, the cell may mean a downlink frequency resource and an uplink frequency resource. Alternatively, the cell may mean a combination of the downlink frequency resource and an optional uplink frequency resource. Further, in general, when the carrier aggregation (CA) is not considered, the uplink and downlink frequency resources may continuously exist as a pair in one cell.

In order to transmit and receive packet data through a specific cell, the UE should first complete a configuration for the specific cell. Herein, the configuration means a status in which the reception of system information required to transmit and receive the data to the corresponding cell is completed. For example, the configuration may include an entire process of receiving common physical layer parameters required for the data transmission and reception, media access control (MAC) layer parameters, or parameters required for a specific operation in an RRC layer. The configured cell is in a status where transmission and reception of the packet are enabled immediately after only information that the packet data may be transmitted is received.

The configured cell may exist in an activation or deactivation status. Here, the activation means that the data is transmitted or received or in a ready status. The UE may monitor or receive a control channel (PDCCH) and a data channel (PDSCH) of the activated cell in order to verify a self-allocated resource (a frequency, a time, and the like).

The deactivation means that transmission or reception of the traffic data is impossible, and measurement or transmission/reception of minimum information is possible. The UE may receive system information (SI) required to receive the packet from the deactivated cell. On the other hand, the UE does not monitor or receive a control channel PDCCH and a data channel PDSCH of the deactivated cell in order to verify the self-allocated resource (a frequency, a time, and the like).

The cell may be classified into a primary cell, a secondary cell, and a serving cell.

The primary cell means a cell that operates at a primary frequency, and means a cell in which the UE performs an initial connection establishment procedure or a connection reestablishment procedure with the base station, or a cell indicated the primary cell during a handover procedure.

The secondary cell means a cell that operates at a secondary frequency, and once RRC establishment is settled, the secondary cell is configured and is used to provide an additional radio resource.

The serving cell is configured as the primary cell in the case of a UE in which the carrier aggregation is not configured or the carrier aggregation cannot be provided. In the case where the carrier aggregation is configured, the term of the serving cell represents a cell configured to the UE and a plurality of serving cells may be configured. One serving cell may be configured by a pair of one downlink component carrier or a pair of {downlink component carrier, uplink component carrier}. The plurality of serving cells may be configured by a set of the primary cell and one secondary cell or a plurality of secondary cells.

A primary component carrier (PCC) means a component carrier (CC) corresponding to the primary cell. The PCC is a CC in which the UE is early connected or RRC-connected with the BS, among many CCs. The PCC is a specific CC that takes charge of connection or RRC connection for signaling regarding a plurality of CCs and manages UE context information which is connection information associated with the UE. Further, the PCC is connected with the UE and continuously exists in the activation status in the case of an RRC connected mode. A downlink component carrier corresponding to the primary cell is referred to as a downlink primary component carrier (DL PCC), and an uplink component carrier corresponding to the primary cell is referred to as an uplink primary component carrier (UL PCC).

A secondary component carrier (SCC) means a CC corresponding to the secondary cell. That is, the SCC, as the CC allocated to the UE in addition to the PCC, is an extended carrier for additional resource allocation and the like of the UE in addition to the PCC, and may be divided into activation and deactivation statuss. Further, in the downlink, a component carrier corresponding to the secondary cell is referred to as a DL secondary CC (DL SCC), and in the uplink, a component carrier corresponding to the secondary cell is referred to as an uplink secondary component carrier (UL SCC).

The primary cell and the secondary cell have the following features.

First, the primary cell is used for transmission of the PUCCH. Second, the primary cell is continuously activated, while the secondary cell is a carrier activated/deactivated according to a specific condition. Third, when the primary cell experiences a radio link failure (hereinafter referred to as an RLF), the RRC-reconnection is triggered. Fourth, the primary cell may be changed by a security key or a handover procedure accompanied with a random access channel (RACH) procedure. Fifth, non-access stratum (NAS) information is received through the primary cell. Sixth, in the case of an FDD system, in the primary cell, the DL PCC and the UL PCC are continuously constituted as a pair. Seventh, a different component carrier (CC) for each UE may be configured as the primary cell. Eighth, the primary cell may be replaced only by handover, cell selection/cell reselection processes. In the addition of a new secondary cell, RRC signaling to transmit system information of a dedicated secondary cell may be used.

In the component carrier constituting one serving cell, the downlink component carrier may constitute one serving cell, and the downlink component carrier and the uplink component carrier are established to constitute one serving cell. However, the serving cell is not constituted by only one uplink component carrier.

Activation/deactivation of the component carrier is equivalent to, that is, a concept of activation/deactivation of the serving cell. For example, assumed that serving cell 1 is constituted by DL CC1, activation of serving cell 1 means activation of DL CC1. Assumed that serving cell 2 is constituted by establishing DL CC2 and UL CC2, activation of serving cell 2 means activation of DL CC2 and UL CC2. In this meaning, each component carrier may correspond to the serving cell.

The number of component carriers aggregated between the downlink and the uplink may be differently set. A case in which the number of the downlink CCs and the number of uplink CCs are the same as each other is referred to as symmetric aggregation, and a case in which the numbers are different from each other is referred to as asymmetric aggregation. Further, sizes (that is, bandwidths) of the CCs may be different from each other. For example, when it is assumed that five CCs are used to configure a 70 MHz-band, the 70 MHz-band may be constituted by a 5 MHz CC (carrier #0), a 20 MHz CC (carrier #1), a 20 MHz CC (carrier #2), a 20 MHz CC (carrier #3), and a 5 MHz CC (carrier #4).

As described above, the CA system may support the plurality of component carriers (CCs), that is, the plurality of serving cells, unlike the single carrier system.

The CA system may support cross-carrier scheduling. The cross-carrier scheduling may be a scheduling method that may perform resource allocation of the PDSCH transmitted through other component carriers through the PDCCH transmitted through a specific component carrier and/or resource allocation of the PUSCH transmitted through other component carriers in addition to the component carrier which is basically linked with the specific component carrier. That is, the PDCCH and the PDSCH may be transmitted through different downlink CCs, and the PUSCH may be transmitted through another uplink CC which is not the uplink CC linked with the downlink CC transmitted by the PDCCH including the UL grant. As such, the system supporting the cross-carrier scheduling may need a carrier indicator indicating that the PDCCH notifies through which DL CC/UL CC the PDSCH/PUSCH providing control information is transmitted. A field including the carrier indicator may be hereinafter called a carrier indication field (CIF).

The CA system supporting the cross-carrier scheduling may include a carrier indication field (CIF) in an existing downlink control information (DCI) format. In the system supporting the cross-carrier scheduling, for example, the LTE-A system, since the CIF is added to the existing DCI format (that is, the DCI format used in the LTE), 3 bits may be extended, and the PDCCH structure may reuse a coding method, a resource allocating method (that is, resource mapping based on the CCE), and the like in the related art.

Figure 4:
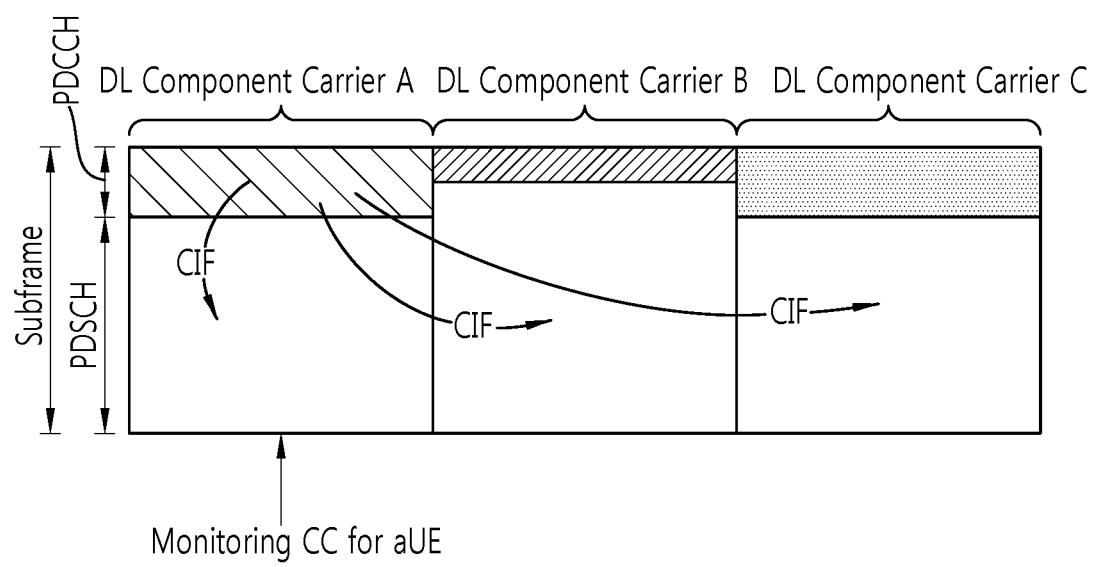
FIG. 4 exemplifies cross-carrier scheduling in a carrier aggregation system.

FIG. 4 exemplifies cross-carrier scheduling in the CA system.

Referring to FIG. 4, the base station may configure a PDCCH monitoring DL CC (monitoring CC) set. The PDCCH monitoring DL CC set is constituted by some DL CCs among all the aggregated DL CCs, and when the cross-carrier scheduling is configured, the UE may perform PDCCH monitoring/decoding with respect to only the DL CC included in the PDCCH monitoring DL CC set. In other words, the base station transmits the PDCCH for the PDSCH/PUSCH to be scheduled through only the DL CC included in the PDCCH monitoring DL CC set. The PDCCH monitoring DL CC set may be configured UE-specifically, UE group-specifically, or cell-specifically.

Figure 6:
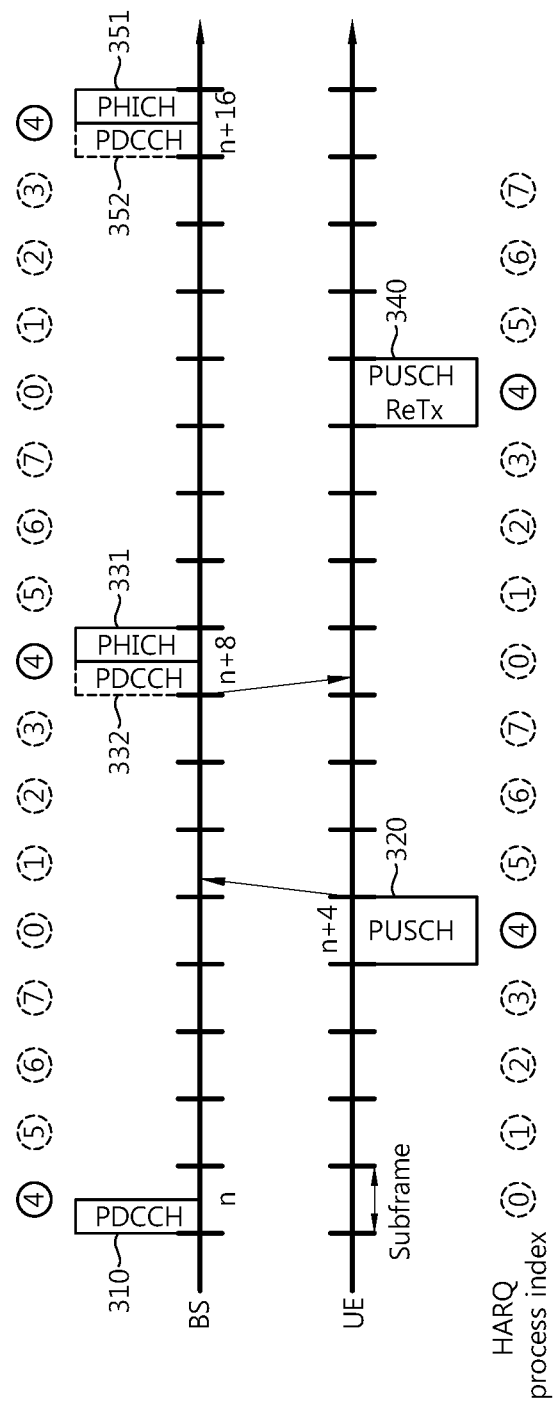
FIG. 6 illustrates uplink synchronous HARQ in 3GPP LTE.

FIG. 6 illustrates an example in which three DL CCs DL CC A, DL CC B, and DL CC C are aggregated and the DL CC A is configured as the PDCCH monitoring DL CC. The UE may receive the DL grant for the PDSCH of the DL CC A, the DL CC B, and the DL CC C through the PDCCH of the DL CC A. The CIF is included in the DCI transmitted through the PDCCH of the DL CC A, and as a result, the CIF may indicate for which DL CC the corresponding DCI is a DCI.

Figure 5:
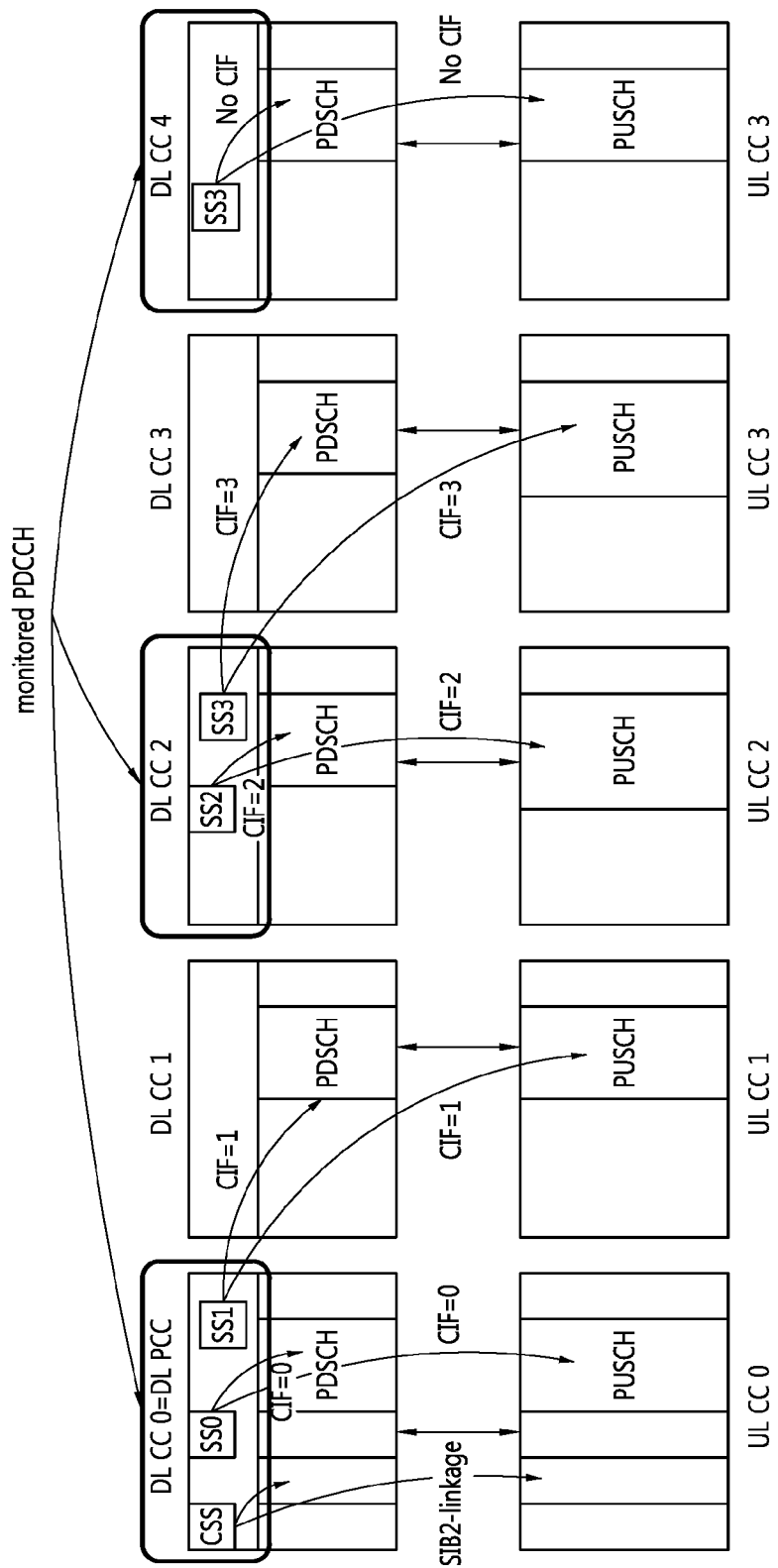
FIG. 5 illustrates a scheduling example in the case where the cross-carrier scheduling is configured in the carrier aggregation system.

FIG. 5 illustrates a scheduling example in the case where the cross-carrier scheduling is configured in the CA system.

Referring to FIG. 5, DL CC 0, DL CC 2, and DL CC 4 are a PDCCH monitoring DL CC set. The UE searches DL grant/UL grant for DL CC 0 and UL CC 0 (DL CC 0 and UL CC linked to SIB 2) in the CSS of DL CC 0. In addition, in SS 1 of DL CC 0, the UE searches DL grant/UL grant for DL CC 1 and UL CC 1. SS1 is an example of the USS. That is, SS 1 of DL CC 0 is a searching space in which the UE searches DL grant/UL grant performing cross-carrier scheduling.

Hereinafter, in 3GPP LTE, HARQ will be described.

The 3GPP LTE uses synchronous HARQ in uplink transmission and asynchronous HARQ in downlink transmission. The synchronous HARQ means that a retransmission timing is fixed, and the asynchronous HARQ means that the retransmission timing is not fixed. That is, in the synchronous HARQ, initial transmission and the retransmission are performed at a HARQ period.

FIG. 6 illustrates uplink synchronous HARQ in 3GPP LTE.

The wireless device receives initial UL grant on a PDCCH 310 from the base station in an n-th subframe.

The wireless device transmits a UL transmission block on a PUSCH 320 by using the initial UL grant in an n+4-th subframe.

The base station transmits an ACK/NACK signal for the UL transmission block on a PHICH 331 in an n+8-th subframe. The ACK/NACK signal represents acknowledge for the UL transmission block, the ACK signal represents reception success, and the NACK signal represents reception failure. When the ACK/NACK signal is the NACK signal, the base station may transmit the retransmission UL grant on a PDCCH 332, or may not transmission separate UL grant.

The wireless device receiving the NACK signal transmits a retransmission block to a PUSCH 340 in an n+12-th subframe. When the wireless device for transmission of the retransmission block receives the retransmission UL grant to the PDCCH 332, the wireless device uses the received retransmission UL grant, and when the wireless device does not receive the retransmission UL grant, the wireless device uses the initial UL grant.

The base station transmits an ACK/NACK signal for the UL transmission block to a PHICH 351 in an n+16-th subframe. When the ACK/NACK signal is the NACK signal, the base station may transmit the retransmission UL grant to a PDCCH 352, or may not transmission separate UL grant.

After initial transmission in the n+4-th subframe, the retransmission is performed in the n+12-th subframe, and as a result, the synchronous HARQ is performed by setting 8 subframes as a HARQ period.

Accordingly, in the 3GPP LTE, 8 HARQ processes may be performed, and in each HARQ process, indexes of 0 to 7 are marked.

Figure 7:
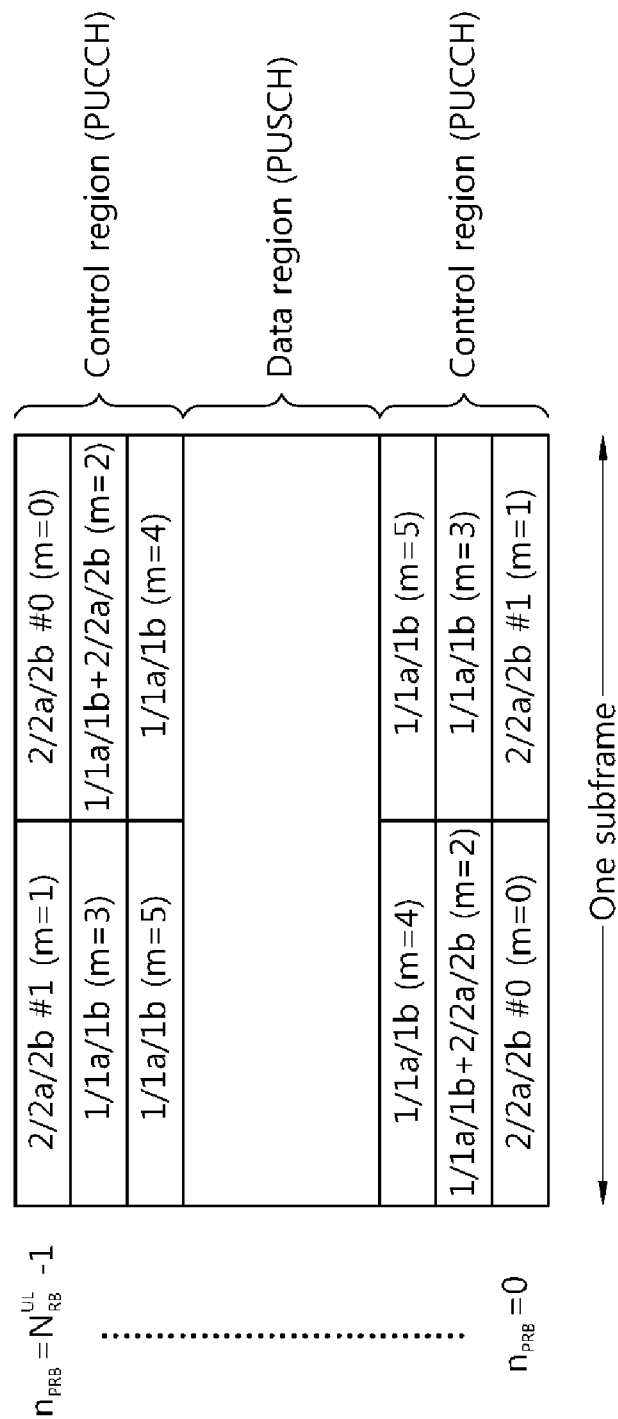
FIG. 7 illustrates a PUCCH and a PUSCH on an uplink subframe.

FIG. 7 illustrates a PUCCH and a PUSCH on an uplink subframe.

PUCCH formats will be described with reference to FIG. 7.

Uplink control information (UCI) may be transmitted to the PUCCH. In this case, the PUCCH transmits various types of control information according to a format. The UCI includes a HARQ ACK/NACK, a scheduling request (SR), and channel status information (CSI) representing a downlink channel status.

PUCCH format 1 transmits a scheduling request (SR). In this case, an on-off keying (OOK) scheme may be applied. PUCCH format 1a transmits an acknowledgement/non-acknowledgment (ACK/NACK) modulated by a binary phase shift keying (BPSK) scheme with respect to one codeword. PUCCH format 1b transmits an ACK/NACK modulated by a quadrature phase shift keying (QPSK) scheme with respect to two codewords. PUCCH format 2 transmits a channel quality indicator (CQI) modulated by the QPSK scheme. PUCCH formats 2a and 2b transport the CQI and the ACK/NACK.

Table 1 illustrates the PUCCH formats.

TABLE 1

| Format | Description |
| --- | --- |
| Format 1 | Scheduling request (SR) |
| Format 1a | ACK/NACK of 1 bit HARQ, Scheduling request (SR) may exist or not |
| Format 1b | ACK/NACK of 2 bit HARQ, Scheduling request (SR) may exist or not |
| Format 2 | CSI (20 code bits) |
| Format 2 | In the case of extended CP, CSI and HARQ ACK/NACK of 1 bit or 2 bits |
| Format 2a | CSI and HARQ ACK/NACK of 1 bit |
| Format 2b | CSI and HARQ ACK/NACK of 2 bits |
| Format 3 | A plurality of ACK/NACKs for carrier aggregation |

Each PUCCH format is mapped in the PUCCH to be transmitted. For example, the PUCCH formats 2/2a/2b are mapped in the resource block (m=0, 1 in FIG. 7) of a band edge allocated to the UE to be transmitted. A mixed PUCCH resource block (RB) may be mapped in a resource block (for example, m=2) adjacent to the resource block to which the PUCCH formats 2/2a/2b are allocated in a central direction of the band to be transmitted. The PUCCH formats 1/1a/1b to which the SR and the ACK/NACK are transmitted may be disposed in a resource block of m=4 or m=5. The number N(2)RB of resource blocks which may be used in the PUCCH formats 2/2a/2b to which the CQI is transmitted may be indicated to the UE through a broadcasted signal.

The aforementioned CSI is an index representing a status of the DL channel, and may include at least one of a channel quality indicator (CQI) and a precoding matrix indicator (PMI). Further, a precoding type indicator (PTI), a rank indication (RI), and the like may be included.

The CQI provides information on link adaptive parameters which may be supported by the UE for a predetermined time. The CQI may indicate a data rate which may be supported by the DL channel by considering a characteristic of the UE receiver, a signal to interference plus noise ratio (SINR), and the like. The base station may determine modulation (QPSK, 16-QAM, 64-QAM, and the like) to be applied to the DL channel and a coding rate by using the CQI. The CQI may be generated by various methods. For example, the various methods include a method of quantizing and feed-backing the channel status as it is, a method of calculating and feed-backing a signal to interference plus noise ratio (SINR), a method of notifying a status which is actually applied to the channel such as a modulation coding scheme (MCS), and the like. When the CQI is generated based on the MCS, the MCS includes a modulation scheme, a coding scheme, and a coding rate according to the coding scheme, and the like.

The PMI provides information on a precoding matrix in precoding based on a code book. The PMI is associated with the multiple input multiple output (MIMO). The feed-backing of the PMI in the MIMO may be called a closed loop MIMO.

The RI is information on the number of layers recommended by the UE. That is, the RI represents the number of independent streams used in spatial multiplexing. The RI is fed-back only in the case where the UE operates in an MIMO mode using the spatial multiplexing. The RI is always associated with one or more CQI feed-backs. That is, the fed-back CQI is calculated by assuming a predetermined RI value. Since the rank of the channel is generally changed slower than the CQI, the RI is fed-back less than the number of CQIs. A transmission period of the RI may be a multiple of the CQI/PMI transmission period. The RI is defined in the entire system band, and a frequency-selective RI feedback is not supported.

As such, the PUCCH is used only in the transmission of the UCI. To this end, the PUCCH support multiple formats.

A PUCCH having different bit numbers for each subframe may be used according to a modulation scheme subordinate to the PUCCH format.

Meanwhile, the illustrated PUSCH is mapped in an uplink shared channel (UL-SCH) which is a transmission channel. Uplink data transmitted on the PUSCH may be a transmission block which is a data block for the UL-SCH transmitted during the TTI. The transmission block may include user data. Alternatively, the uplink data may be multiplexed data. The multiplexed data may be acquired by multiplexing the transmission block for the UL-SCH and the channel status information. For example, the channel status information (CSI) multiplexed in the data may include the CQI, the PMI, the RI, and the like. Alternatively, the uplink data may be constituted by only the uplink status information. Periodic or aperiodic channel status information may be transmitted through the PUSCH.

The PUSCH is allocated by the UL grant on the PDCCH. Although not illustrated, a fourth OFDM symbol of each slot of the normal CP is used in the transmission of a demodualtion reference signal (DM RS) for the PUSCH.

Periodic Transmission of CSI.

The CSI may be transmitted through the PUCCH periodically according to a period determined in the upper layer. That is, the periodic channel status information (CSI) may be transmitted through the PUCCH.

The UE may be semistatically configured by an upper layer signal so as to periodically feed-back a differential CSI (CQI, PMI, RI) through the PUCCH. In this case, the UE transmits the corresponding CSI according to modes defined as shown in a table given below.

TABLE 2

|  |  | PMI feed-back time | |
| --- | --- | --- | --- |
|  |  | No PMI | Single PMI |
| PUCCH CQI feed-back type | Wideband CQI | Mode 1-0 | Mode 2-0 |
|  | Selective subband CQI | Mode 2-0 | Mode 2-1 |

A periodic CSI reporting mode in the PUCCH described below is supported for each of the aforementioned transmission modes.

TABLE 3

| Transmission mode (transmission mode) | PUCCH CSI reporting modes |
| --- | --- |
| Transmission mode 1 | Modes 1-0, 2-0 |
| Transmission mode 2 | Modes 1-0, 2-0 |
| Transmission mode 3 | Modes 1-0, 2-0 |
| Transmission mode 4 | Modes 1-1, 2-1 |
| Transmission mode 5 | Modes 1-1, 2-1 |
| Transmission mode 6 | Modes 1-1, 2-1 |
| Transmission mode 7 | Modes 1-0, 2-0 |
| Transmission mode 8 | When PMI/RI reporting is configured to UE in modes 1-1 and 2-1; When PMI/RI reporting is not configured to UE in modes 1-0 and 2-0 |
| transmission mode 9 | When PMI/RI reporting is configured to UE in modes 1-1 and 2-1 and the number of CSI-RS ports is larger than 1. When PMI/RI reporting is not configured to UE in modes 1-0 and 2-0or the number of CSI-RS ports is 1 |

Meanwhile, a collision of the CSI report means a case in which a subframe configured to transmit a first CSI and a subframe configured to transmit a second CSI are the same as each other. When the collision of the CSI report occurs, the first CSI and the second CSI are simultaneously transmitted, or the transmission of a CSI having a low priority is discarded (alternatively, referred to as abandon or drop), and a CSI having a high priority may be transmitted, according to priorities of the first CSI and the second CSI.

The CSI report through the PUCCH may include various report types according to a transmission combination of the CQI, the PMI, and the RI, and a period and an offset value divided according to each report type (hereinafter, abbreviated as a type) are supported.

Type 1: Supports CQI feedback for a subband selected by the UE.

Type 1a: Supports subband CQI and second PMI feedback.

Types 2, 2b, and 2c: Supports wideband CQI and PMI feedback.

Type 2a: Supports wideband PMI feedback.

Type 3: Supports RI feedback.

Type 4: Transmits the wideband CQI.

Type 5: Supports RI and wideband PMI feedback.

Type 6: Supports RI and PTI feedback.

<Problems of Periodic Transmission of CSI>

Meanwhile, the plurality of serving cells is introduced, and many kinds of UCIs need to be transmitted together to one UL channel according to an increase in types of UCIs.

Collision in the same subframe may occur between periodic CSI transmissions for a single cell or a plurality of cells, and in this case, any one CSI report is selected according to a CSI report type and a priority of the cells, and the remaining CSI information may be dropped.

That is, as the number of cells to be targeted for the carrier aggregation (CA) is increased, the number of periodic CSI reports is increased together, and in this situation, deterioration of DL throughput performance may occur due to excessive CSI drop.

Accordingly, a next system may consider simultaneously transmitting a plurality of periodic CSI reports to the same subframe in order to solve or alleviate the problem.

The simultaneous transmission for the plurality of periodic CSI reports may use a PUCCH resource or a PUSCH resource periodically transmitted. For example, the HARQ ACK and the CSI may be simultaneously transmitted on the PUCCH. According to a structure of the existing PUCCH format 3, the HARQ ACK and the CSI generate one codeword (corresponding to a control information bit sequence) to be transmitted.

However, a payload size of the periodic CSI which may be transmitted in one subframe based on 3GPP Rel-10 is limited to maximum 11 bits. Accordingly, setting of a new reference of a bit field configuration of the CSI report to be subjected to simultaneous transmission is required.

In order to solve the problem, in the exemplary embodiment of the present invention, when the plurality of periodic CSI reports is simultaneously transmitted in the same subframe, methods of configuring information to be simultaneously transmitted based on a kind of CSI information are proposed.

Figure 8:
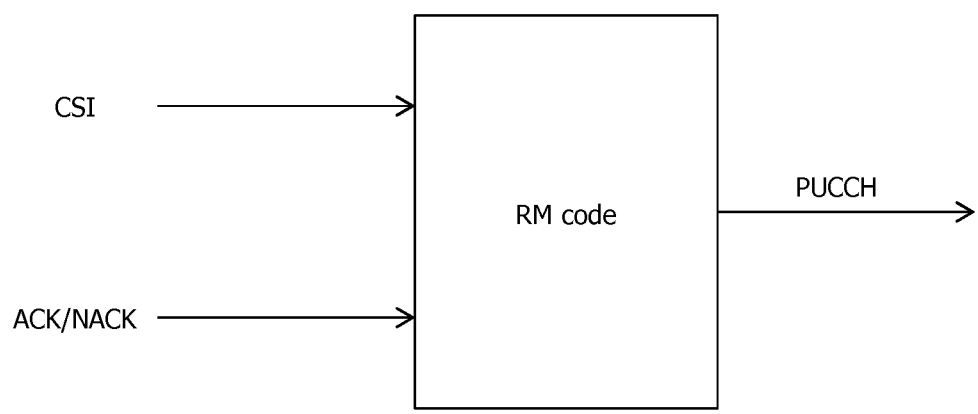
FIG. 8 illustrates an example of multiplexing informations to be simultaneously transmitted to the PUCCH according to an exemplary embodiment of the present invention.

FIG. 8 illustrates an example of multiplexing various information to be simultaneously transmitted to the PUCCH according to an exemplary embodiment of the present invention.

Referring to FIG. 8, in the case of using the extended CP, the CSI and the ACK/NACK are joint-coded by a Reed-Muller (RM) code to multiplex various information. In this case, the maximum bit number of information bits supported by the RM code may be 13. In this case, CQI information bits may be 11 bits, and ACK/NACK information bits may be 2 bits. The CQI information bits and the ACK/NACK information bits are concatenated to generate a bit stream and thereafter, channel-coded by the RM code. In this case, it is expressed that the CQI information bits and the ACK/NACK information bits are joint-coded.

In this case, in the exemplary embodiment of the present invention, information to be simultaneously transmitted is selected from the CSI such as the CQI, the PMI, the PTI, and the RI. At this time, methods of selecting and configuring the information to be simultaneously transmitted may be divided into a method for a single cell and a method for a multiple cell.

Method for Single Cell

With respect to the periodic CSI transmission mode, a system bandwidth is constituted by a plurality of bandwidth parts (BPs), and further, the bandwidth part (BP) may include a plurality of subbands. In the periodic CSI, the RI and the wideband CQI are not relatively largely changed with time, and as a result, the period may be largely configured as compared with subband CQI. That is, an object of the plurality of RI reports or wideband CQI reports may be only updating a corresponding value according to a change in channel environment. For this reason, the RI or the wideband CQI which is transmitted through the plurality of subframes is not allowed to be simultaneously transmitted to one subframe. As an example thereof, the RI transmitted through the plurality of subframes is not simultaneously transmitted to one subframe, and further, the wideband CQI/PMI through the plurality of subframes may not be simultaneously transmitted to one subframe.

The subband CQI report may not be transmitted once because the bit number to be transmittable once in the periodic CSI is limited, and as a result, the subband CQI report is transmitted through the plurality of subframes based on Rel-10. In the subband CQI report, one cycle is constituted by corresponding selection information and subband CQI reports by selecting one subband for each band part (BP) in order of band parts (BP), and a plurality of cycles may exist between two contiguous wideband CQI reports. Duplication for updating may occur between the subbands selected when the plurality of cycles is applied, and in order to handle information on many subbands, different subands may be selected without duplication. The number of cycles is represented by a parameter K based on the Rel-10 system. In a next system, the subband CQI reports transmitted through the plurality of subframes with respect to at least one cell may be simultaneously transmitted to the same subframe, and as a result, a collision degree between the CSI reports may be reduced, and a plurality of subband CQI information may be simultaneously updated to the base station eNodeB without delay. Next, a detailed example for a configuring method for subband CQI to be simultaneously transmitted will be described.

As a first example, the UE multiplexes all the subband CQI reports to be transmitted between two contiguous windband CQI so as to be simultaneously transmitted to one subframe based on a case where simultaneous transmission for the plurality of periodic CSI is not configured. In this case, the subband CQI to be simultaneously transmitted is adjusted so that the subbands are not duplicated.

As a second example, the UE multiplexes the CQI for all the subbands so as to be simultaneously transmitted in one subframe. In this case, bits called a subband for each band part (BP) are removed, and a bit field to be simultaneously transmitted is constituted by only the subband CQIs.

As a third example, the UE multiplexes all the subband CQI reports in one cycle based on a cycle to be simultaneously transmitted to one subframe. The subband CQI reports to be simultaneously transmitted are constituted as one subband CQI report with respect to each of the band parts (BPs).

As a fourth example, the UE multiplexes all the subband CQI reports in n cycles based on a cycle to be simultaneously transmitted to one subframe. Herein, n may be predetermined, and may be set in the high layer. As such, when n is predetermined, n may set a system bandwidth and the number of activated cells as parameters.

The method of configuring the bit field for simultaneous transmission of the subband CQI described above may be pre-configured or configured through signaling of the upper layer. A bundle of the subband CQI reports may configure a offset in the upper layer to be different from the wideband CQI, and as a result, the bundle of the subband CQI reports and the wideband CQI may be configured so as not to be collide with each other in the same subframe. Alternatively, a mode of gradually configuring only the subband CQI as a bundle, a mode of additionally binding the wideband CQI/PMI to the subband bundle, and a mode of binding all the remaining CSI to be simultaneously transmitted to one subframe may be configured, respectively.

In each subband CQI report, bits indicating one subband selected in the band part (BP) may be included. However, in the case where the number of subbands constituting the band part (BP) is not the multiplier of 2, a waste of the subbands may occur in a substantial usage of the bits. When information indicating the subband in the band part (BP) is configured based on the plurality of subband CQI reports instead of a single subband CQI report, the number of total bits for indicating the selected subbands may be reduced.

Hereinafter, detailed examples for bit configuration for the subband indication will be described.

In a first example, the UE configures bits indicating the subband based on all of the selected subbands with respect to all the subband CQI reports to be transmitted between two contiguous wideband CQI based on a case where the simultaneous transmission of the plurality of periodic CSI is not configured. For example, three BPs are constituted by three subbands, three subbands, and one subband, respectively, and when two cycles are transmitted, the number of total indication bits which is 12 bits (2 bits×3×2) may be decreased below based on 3GPP Rel-10.

$$7 \text{ bits}(\lceil log2(3^2 \times 3^2 \times 1^2) \rceil) \quad \text{[Equation 1]}$$

In a second example, the UE configures bits indicating the subband based on all of the selected subbands with respect to all the subband CQI reports in one cycle based on the cycle.

In a third example, the UE configures bits indicating the subband based on all of the selected subbands with respect to all the subband CQI reports in m cycles based on the cycle. Hereinabove, m is predetermined or may be set in the high layer, and may be set to be equal to the parameter n.

In a fourth example, the UE may select the same subbands as the number of band parts (BP) in the entire subband configuring the system bandwidth and select indication bits for the subband in accordance with the situation. For example, when a total subband number is 7 and the number of BPs is 3, the indication bit number is as the following Equation.

$$5 \text{ bits}\left(\left\lceil \log_2 \binom{7}{3} \right\rceil\right) \quad \text{[Equation 2]}$$

Hereinafter, contents for a method in which the UE simultaneously transmits periodic CSI reports for the plurality of cells will be described.

Method for Multiple Cell

When RI, wideband CQI/PMI, a subband CQI bundle, and the like for a single or plurality of cells collide with each other in the same subframe, in the next system, a situation supporting the simultaneous transmission may be considered.

Generally, since a payload size for the subband CQI bundle is set to be relatively larger than another CSI information, when transmission of the plurality of subband CQI bundles collides with each other in the plurality of cells, an overhead of the uplink may be significantly increased. As a method of solving or reducing the problem, a method of adaptively setting the number of RBs occupied by the uplink channel for periodic CSI simultaneous transmission for the plurality of cells may be applied, and in the case where collision occurs between the multiple cells by using offset for the subband CQI bundle without collision in the same subframe, it may be considered that some subband CQI bundles are dropped.

Hereinafter, a more detailed example for a processing method when the CSI reports for different cells collide with each other in the same subframe will be described.

As a first example, the UE adaptively configures a resource block (RB) to be allocated to the uplink channel for the plurality of periodic CSI reports, by setting whether the subband CQI transmission is configured, a system bandwidth, the number of subband CQI report cycles, and the number of cells to be targeted for carrier aggregation (CA) as parameters. In this case, whether the subband CQI transmission is configured is set based on a transmission mode (TM). In addition, the number of cells to be targeted for CA may be limited as the number of activated cells. The uplink channel may be configured as a periodic PUSCH, and the UE may control the number of RBs to be allocated to the periodic PUSCH based on the above parameters. An example based on the parameters may be limited based on the total bit number of the periodic CSI to be transmitted.

As a second example, the UE configures whether multiple subband CQI bundles for the plurality of cells are simultaneously transmitted in the same subframe by setting whether the subband CQI transmission is configured, a system bandwidth, the number of subband CQI report cycles, and the number of cells to be targeted for CA as parameters. When the simultaneous transmission is not allowed, some subband CQI bundles are dropped based on a priority for the cells.

As a third example, the UE does not allow the multiple subband CQI bundles for the plurality of cells to be simultaneously transmitted in the same subframe. When the multiple subband CQI bundles collide with each other in the same subframe, some subband CQI bundles are dropped based on a priority for the cells.

Accordingly, the base station, that is, the eNodeB may configure an offset and a period so that the subband CQI bundles for the plurality of cells and other periodic CSI reports are simultaneously transmitted.

The plurality of cells may generally select different TMs, and in this case, significantly many combinations of CSI information configuring the plurality of periodic CSI may be included. The problem of collision between the subband CQI bundles may be simply avoided or reduced only in the case where the transmission mode (TM) may be configured or is configured so as to have the same CSI report mode in some cells of the plurality of cells.

As an example, a case where two cells of the plurality of cells is configured as the TM corresponding to the subband CQI report will be considered. Further, a case where the subband CQI bundle is transmitted through one subframe will be limited. In above example, the subband CQI bundle may be constituted by one cycle. Since periods and offsets of the wideband CQI/PMI and the subband CQI are equally set with respect to two cells, when the plurality of subband CQI bundles collide with each other, the UE may swap a subband CQI report instance and a wideband CQI report instance with respect to one cell. As a result, each subband CQI bundle is simultaneously transmitted with the wideband CQI/PMI for another cell to relatively decrease the entire payload size.

Meanwhile, although not described, the collision problem between the plurality of periodic CSI reports and the semi-persistent scheduled (SPS)/grant-based PUSCH may be considered.

Based on the Rel-10, when the periodic CSI report and the PUSCH collide with each other in the subframe, the periodic CSI is piggy-back on the PUSCH. However, in the next system, when considering the simultaneous transmission of the plurality of periodic CSI, the payload size may be largely increased as compared with the existing system, and as a result, in the case of piggybacking the plurality of periodic CSI on the PUSCH, an error requirement for the data included in the PUSCH and an error requirement for the CSI may not be satisfied. Accordingly, the UE may consider the dropping in the case where the plurality of periodic CSI to be simultaneously transmitted collide with the SPS/grant-based PUSCH in the same subframe.

Hereinafter, a more detailed example for a work to be performed by the UE in the case where the plurality of periodic CSI to be simultaneously transmitted and the PUSCH collide with each other in the same subframe will be described.

As a first example, the UE may drop the plurality of periodic CSI and transmit the SPS/grant-based PUSCH.

As a second example, the UE may be configured to determine whether the plurality of periodic CSI is dropped by setting the payload size for the plurality of periodic CSI and the number of RBs allocated to the SPS/grant-based PUSCH as parameters.

As a third example, the UE may piggyback a single periodic CSI report selected based on the case where the simultaneous transmission of the plurality of periodic CSI is not configured on the PUSCH.

Up to now, selectively multiplexing the information regarding the CSI to be simultaneous transmitted on the PUCCH in the periodic CSI transmission is described. As described above, the CSI for the downlink data transmitted from the plurality of cells through the plurality of subframes may be efficiently simultaneously transmitted, and as a result, the dropped degree due to the collision between the periodic CSI reports may be reduced. Further, according to the aforementioned contents, when the plurality of periodic CSI reports is simultaneously transmitted, the uplink radio resource may be more efficiently used.

Hereinafter, aperiodic transmission of the CSI and exemplary embodiments of the present invention related thereto will be described.

Aperiodic Transmission of CSI.

A control signal requesting to transmit the CSI, that is, an aperiodic CSI request signal may be included in a scheduling control signal for the PUSCH transmitted to the PDCCH, that is, the UL grant. In this case, the UE aperiodically reports the CSI through the PUSCH. As such, the CSI transmission on the PUSCH is triggered by the request of the base station to be called an aperiodic CSI report. The CSI report may be triggered by the UL grant or a random access response grant.

Figure 9:
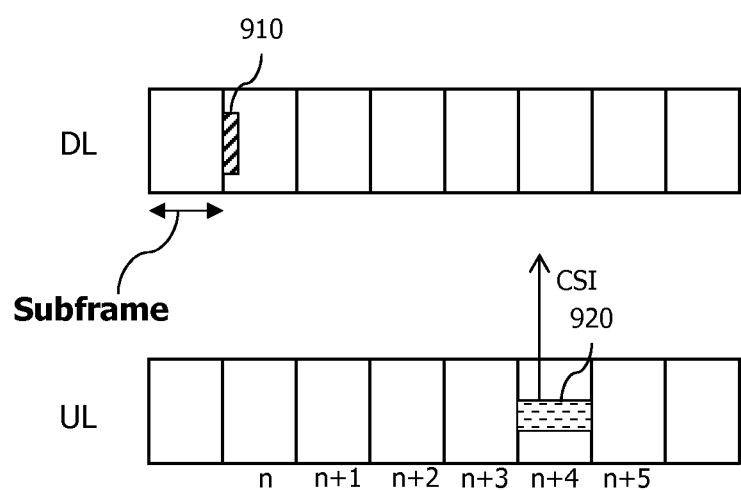
FIG. 9 illustrates an example of an aperiodic CSI report in 3GPP LTE.

FIG. 9 illustrates an example of an aperiodic CSI report in 3GPP LTE.

The wireless device receives the UL grant including scheduling information for the PUSCH to a PDCCH 910 in a subframe n. The UL grant may include a CQI request field. The following Table illustrates an example of a CQI request field of 2 bits. Values or the bit number of the CQI request field are just exemplified.

TABLE 4

| Value of CQI request field | Content |
| --- | --- |
| 00 | CSI report is not triggered |
| 01 | CSI report for serving cell is triggered. |
| 10 | CSI report for first set of serving cells is triggered. |
| 11 | CSI report for second set of serving cells is triggered. |

Information on first and second sets in which the CSI report is triggered may be pre-notified to the wireless device by the base station.

When the CSI report is triggered, the wireless device transmits the CSI to a PUSCH 920 in a subframe n+k. Here, k=4, but this is just exemplified.

A report mode of the CSI may be pre-defined to the wireless device by the base station.

The following Table illustrates an example of the CSI report mode in the 3GPP LTE.

TABLE 5

| | PMI feedback type | | |
| --- | --- | --- | --- |
| | No PMI | Single PMI | Multiple PMI |
| Wideband CQI | | | Mode 1-2 |
| Selective subband CQI | Mode 2-0 | | Mode 2-2 |
| Configured subband CQI | Mode 3-0 | Mode 3-1 | |

(1) Mode 1-2

With respect to each subband, a precoding matrix is selected on the assumption that DL data is transmitted through only the corresponding subband. The wireless device assumes the selected precoding matrix with respect to the system band or the entire band (referred to as a band set S) defined by the upper layer signal and generates the CQI (referred to as wideband CQI).

The wireless device transmits CSI including the wideband CQI and the PMI of each subband. In this case, a size of each subband may vary according to a size of the system band.

(2) Mode 2-1

The wireless device selects M preferable subbands with respect to the system band or the entire band (the band set S) defined by the upper layer signal. The wireless device generates subband CQI on the assumption that the data is transmitted in the M selected subbands. The wireless device additionally generates on wideband CQI with respect to the system band or the band set S.

The wireless device transmits CSI including information on the M selected subbands, the subband CQI, and the wideband CQI.

(3) Mode 2-2

The wireless device selects M preferable subbands and a single precoding matrix for the M preferable subbands on the assumption that the DL data is transmitted through the M preferable subbands.

Subband CQI for the M preferable subbands is defined for each codeword. The UE additionally generates wideband CQI with respect to the system band or the band set S.

The wireless device transmits CSI including the M preferable subbands, one subband CQI, PMI for M preferable subbands, wideband PMI, and wideband CQI.

(4) Mode 3-0

The wireless transmits the CSI including the wideband CQI and the subband CQI for the configured subband.

(5) Mode 3-1

The wireless device generates a single precoding matrix with respect to the system band or the band set S. The wireless device assumes the generated single precoding matrix and generates subband CQI for each codeword. The wireless device assumes the single precoding matrix and may generate wideband CQI.

<Simultaneous Transmission of PUCCH and PUSCH>

In a 3GPP release 8 or release 9 system, when the UE uses a SC-FDMA scheme in the uplink transmission, in order to maintain a characteristic of the single carrier, the PUCCH and the PUSCH are configured so as not to be simultaneously transmitted on one carrier.

However, in a 3GPP release 10 system, whether the simultaneous transmission of the PUCCH and the PUSCH is supported may be instructed in the upper layer. That is, according to the instruction of the upper layer, the UE may simultaneously transmit the PUCCH and the PUSCH and may transmit only one of the PUCCH and the PUSCH.

Figure 10:
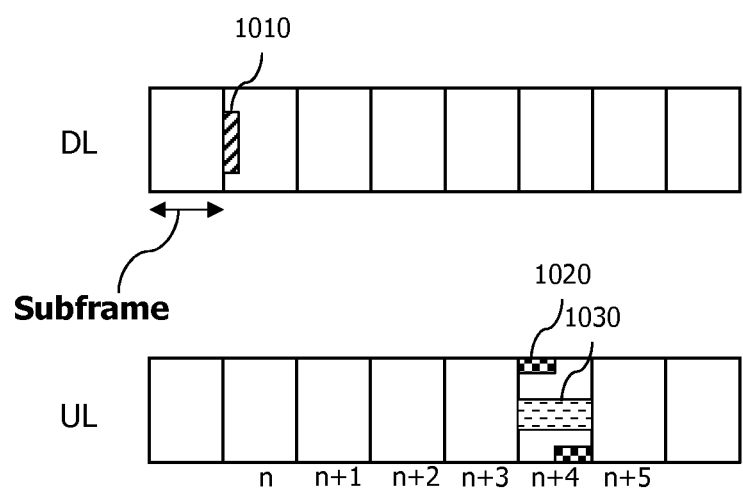
FIG. 10 illustrates an example of simultaneous transmission of a PUCCH and a PUSCH.

FIG. 10 illustrates an example of simultaneous transmission of the PUCCH and the PUSCH.

As illustrated in FIG. 10, the UE receives a PDCCH 10110 in a subframe n.

In addition, the UE may simultaneously transmit a PUCCH 1020 and a PUSCH 1030 in a subframe n+4.

As such, the simultaneous transmission of the PUCCH and the PUSCH is defined below in the 3GPP release 10 system.

It is assumed that the UE is configured for only a single serving cell and so that simultaneous transmission of the PUCCH and the PUSCH is not performed. In this case, when the UE does not transmit the PUSCH, the UCI may be transmitted through PUCCH formats 1/1a/1b/3. When the UE transmits the PUSCH, if the PUSCH does not correspond to the random access response grant, the UCI may be transmitted through the PUSCH.

Unlike this, it is assumed that the UE is configured for only a single serving cell and so that simultaneous transmission of the PUCCH and the PUSCH may be performed. In this case, when the UCI is constituted by only the HARQ-ACK and the SR, the UCI may be transmitted to the PUCCH through the PUCCH formats 1/1a/1b/3. However, when the UCI is constituted by only the periodic CSI, the UCI may be transmitted to the PUCCH through the PUCCH format 2. Alternatively, when the UCI is constituted by the periodic CSI and the HARQ-ACK and the UE does not transmit the PUSCH, the UCI may be transmitted to the PUCCH through the PUCCH formats 2/2a/2b. Alternatively, in the case where the UCI is constituted by only the HARQ-ACK/NACK, constituted by the HARQ-ACK/NACK and the SR, constituted by positive SR and periodic/aperiodic CSI, or constituted by only the aperiodic CSI, the HARQ-ACK/NACK, the SR, and the positive SR are transmitted to the PUCCH, an the periodic/aperiodic CSI may be transmitted through the PUSCH.

Further, unlike this, it is assumed that the UE is configured for one or more serving cells and so that the PUSCH and the PUCCH are not simultaneously transmitted. In this case, when the UE does not transmit the PUSCH, the UCI may be transmitted to the PUCCH according to the PUCCH formats 1/1a/1b/3. However, when the UCI is constituted by the aperiodic CSI or constituted by the aperiodic CSI and the HARQ-ACK, the UCI may be transmitted through the PUSCH of the serving cell. Alternatively, when the UCI IS constituted by the periodic CSI and the HARQ-ACK/NACK and the UE does not transmit the PUSCH in the subframe n of the primary cell, the UCI may be transmitted to the PUSCH.

Further, unlike this, it is assumed that the UE is configured for one or more serving cells and so that the PUSCH and the PUCCH are simultaneously transmitted. In this case, when the UCI is constituted by at least one of the HARQ-ACK and the SR, the UCI may be transmitted to the PUCCH through the PUCCH formats 1/1a/1b/3. However, when the UCI is constituted by only the periodic CSI, the UCI may be transmitted to the PUCCH by using the PUCCH format 2. Alternatively, when the UCI is constituted by the periodic CSI and the HARQ-ACK/NACK and the UE does not transmit the PUSCH, the CSI may not be transmitted but dropped according to some conditions. Alternatively, when the UCI is transmitted to the periodic CSI and the HARQ-ACK/NACK and the UE transmits the PUSCH to the subframe of the primary cell, the HARQ-ACK/NACK may be transmitted to the PUCCH by using the PUCCH formats 1a/1b/3, and the periodic CSI may be transmitted to the PUSCH.

<Problem Related with Simultaneous Transmission of PUCCH and PUSCH>

As described above, when the PUCCH and the PUSCH are not simultaneously transmitted, when the plurality of HARQ-ACK/NACKs to be transmitted exists, the PUCCH format 3 needs to be used as illustrated in Table 1, and as a result, the CSI is not transmitted but frequently dropped and thus the deterioration of downlink performance may occur.

In order to solve the problem, in the case where the simultaneous transmission of the PUCCH and the PUSCH is not configured, information on the plurality of HARQ-ACKs and information on the periodic CSI are multiplexed in the PUCCH resource to improve so that the PUCCH and the PUSCH are simultaneously transmitted in a single subframe.

However, only the improvement is insufficient, and the reason is as follows.

First, even though the PUCCH and the PUSCH are simultaneously transmitted, the PUSCH transmission is not always ensured, and as a result, when the plurality of HARQ-ACK/NACKs to be transmitted exists, since the PUCCH format 3 needs to be used as illustrated in Table 1, the CSI is not transmitted but frequently dropped and thus the deterioration of downlink performance may occur.

In order to solve the problem, even when the simultaneous transmission of the PUCCH and the PUSCH is configured, the existing PUCCH format is improved so as to permit the simultaneous transmission of the information on the plurality of HARQ-ACKs and the information on the periodic CSI through the PUCCH resource, and as a result, the UL transmission resource may be efficiently allocated and used when the UCI and the UL-SCH are transmitted.

However, in this case, when the UE loses the PDCCH corresponding to the UL grant in the subframe where the PUCCH and the PUSCH are simultaneously transmitted, since the UE and the eNodeB may differently understand the UCI transmission method, an uncertainty or ambiguity problem may occur. As a result, this may cause the deterioration of downlink performance again.

Accordingly, hereinafter, according to another exemplary embodiment of the present invention, in the case where the simultaneous transmission of the PUCCH and the PUSCH is configured, a method of allocating the UL resource for the simultaneous transmission of the HARQ-ACK and the CSI will be described. The method may be largely divided into three methods. A first method is a method for a subframe in which the aperiodic CSI is not transmitted, a second method is a method for a subframe in which the aperiodic CSI is transmitted, and a third method is a method for a subframe in which the periodic CSI report for the plurality of cells is transmitted. Ambiguity between the UE and the eNodeB may be removed by the methods.

Method for a subframe in which the aperiodic CSI is not transmitted

First, when the simultaneous transmission of the PUCCH and the PUSCH is configured, the simultaneous transmission of the information on the plurality of HARQ-ACKs and the information on the periodic CSI using the PUCCH resource may be configured not to be allowed.

Alternatively, when the simultaneous transmission of the PUCCH and the PUSCH is configured, after the simultaneous transmission of the information on the plurality of HARQ-ACKs and the information on the periodic CSI using the PUCCH resource is allowed, an additional work may be performed. As a detailed simultaneous transmission method therefor, the UCI to be transmitted through the PUCCH resource with respect to all the subframes may be selected regardless of the simultaneous transmission of the PUCCH and the PUSCH by the same reference as the case where the simultaneous transmission of the PUCCH and the PUSCH is not configured.

As another detailed content of the simultaneous transmission method, in the subframe in which only the PUCCH is transmitted, the UCI to be transmitted through the PUCCH resource is selected by the same reference as the case where the simultaneous transmission of the PUCCH and the PUSCH is not configured, and in the subframe in which the PUCCH and the PUSCH are simultaneously transmitted, the UCI to be transmitted through the PUCCH resource is selected as the HARQ-ACK, and only the transmission method for the PUCCH resource may be selected by the same reference as the case where the simultaneous transmission of the PUCCH and the PUSCH is not configured.

The methods may be configured depending on a situation in the upper layer. Next, when both the simultaneous transmission of the PUCCH and the PUSCH and the simultaneous transmission of the information on the plurality of HARQ-ACKs and the information on the periodic CSI are configured, a detailed example of the UCI transmission method through the PUCCH resource will be described.

As a first example, the UCI to be transmitted through the PUCCH resource is configured equally to the case where the simultaneous transmission of the PUCCH and the PUSCH is not configured in all subframes regardless of the simultaneous transmission of the PUCCH and the PUSCH. Here, in the case where the simultaneous transmission of the PUCCH and the PUSCH is not configured, the UCI may be constituted by the HARQ-ACK information for the plurality of cells and the periodic CSI for the single cell. When the HARQ-ACK performs bundling in the case where the PUCCH and the PUSCH are not simultaneously transmitted, the bundling is performed equally even in the case where the PUCCH and the PUSCH are simultaneously transmitted.

As a second example, in the subframe in which the PUCCH and the PUSCH are simultaneously transmitted, the UCI to be transmitted through the PUCCH resource is constituted by the HARQ-ACKs for the plurality of cells. In this case, the PUCCH transmission method for the plurality of HARQ-ACKs is configured equally to the transmission method for the PUCCH resource for the simultaneous transmission of the HARQ-ACK and the periodic CSI in the case where the simultaneous transmission of the PUCCH and the PUSCH is not configured.

In the second example, selection for a coding scheme (for example, single RM or Dual RM coding) according to the UCI bit number is configured equally to the reference when the HARQ-ACK and the periodic CSI are simultaneously transmitted.

For example, when the joint-coding is used, if a total of the number of bits of the HARQ-ACK and the periodic CSI is more than 11 bits, the HARQ-ACK is encoded by using the Dual-RM coding. In the case of using separate coding, the HARQ-ACK is encoded by using the Dual-RM coding even in the case where the periodic CSI is not transmitted. In the subframe where only the PUCCH is transmitted, the UCI transmission is performed equally to the case where the simultaneous transmission of the PUCCH and the PUSCH is not configured.

Figure 11:
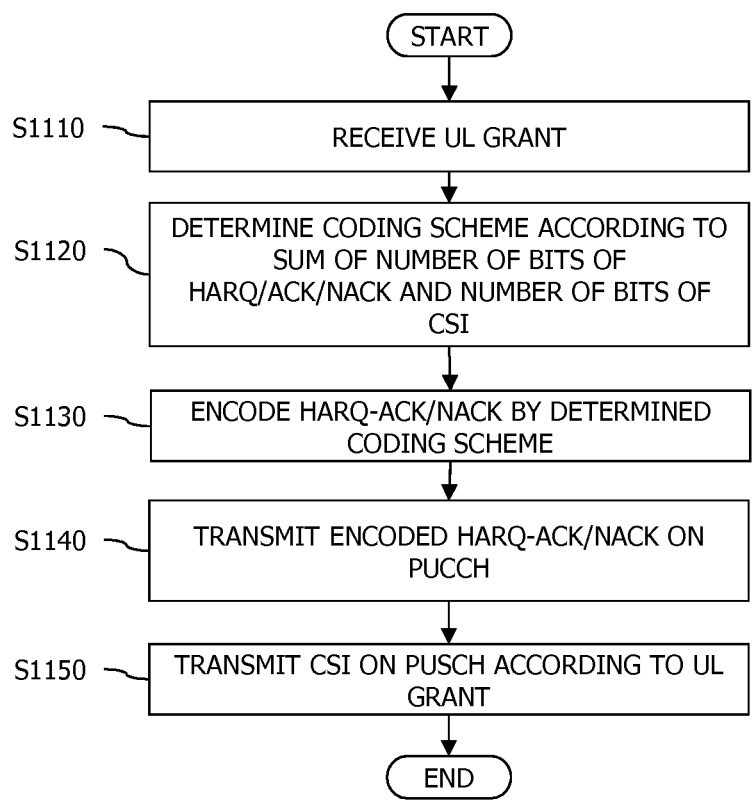
FIG. 11 is a flowchart illustrating a method for transmitting an ACK/NACK of HARQ and a CSI in a subframe where a PUCCH and a PUSCH are simultaneously transmitted.

The second example is illustrated in FIG. 11.

FIG. 11 is a flowchart illustrating a method for transmitting an ACK/NACK of HARQ and a CSI in a subframe where the PUCCH and the PUSCH are simultaneously transmitted.

As illustrated in FIG. 11, when a UL grant is received (S1110), a coding scheme is determined according to the sum of the number of bits of the ACK/NACK of HARQ and the number of bits of the CSI (S1120). That is, any one of the single RM coding or the dual RM coding is selected.

Herein, in LTE-A, the introduced PUCCH format 3 may transmit maximum 48 bits, but the channel coding uses a basis sequence for (32, A) block code.

Accordingly, according to whether the bit number A of the transmission information is larger than the number of RM basis (also referred to as a basis sequence), any one of the single RM coding or the dual RM coding is selected. Here, the number of RM basis is 11.

That is, when A<=11, since one RM block code (alternatively, one RM encoder) is used, this is called single RM. When A>11, since two RM block codes (alternatively, two RM encoders) are used, this is called dual RM.

Accordingly, additional bits having the bit number corresponding to the bit number of the CSI are added to the bits of the HARQ ACK/NACK, and when the bit number A of the HARQ ACK/NACK to which the additional bits are added is larger than 11, the dual RM is used.

As such, when the coding scheme is determined, the HARQ-ACK/NACK is encoded by the determined coding scheme (S1130). In detail, as described above, when the dual RM is determined, the HARQ ACK/NACK to which the additional bits are added is encoded by the dual RM scheme.

In addition, the encoded HARQ-ACK/NACK is transmitted through the PUCCH (S1140), and the CSI is transmitted to the PUSCH according to the UL grant (S1150).

Figure 12:
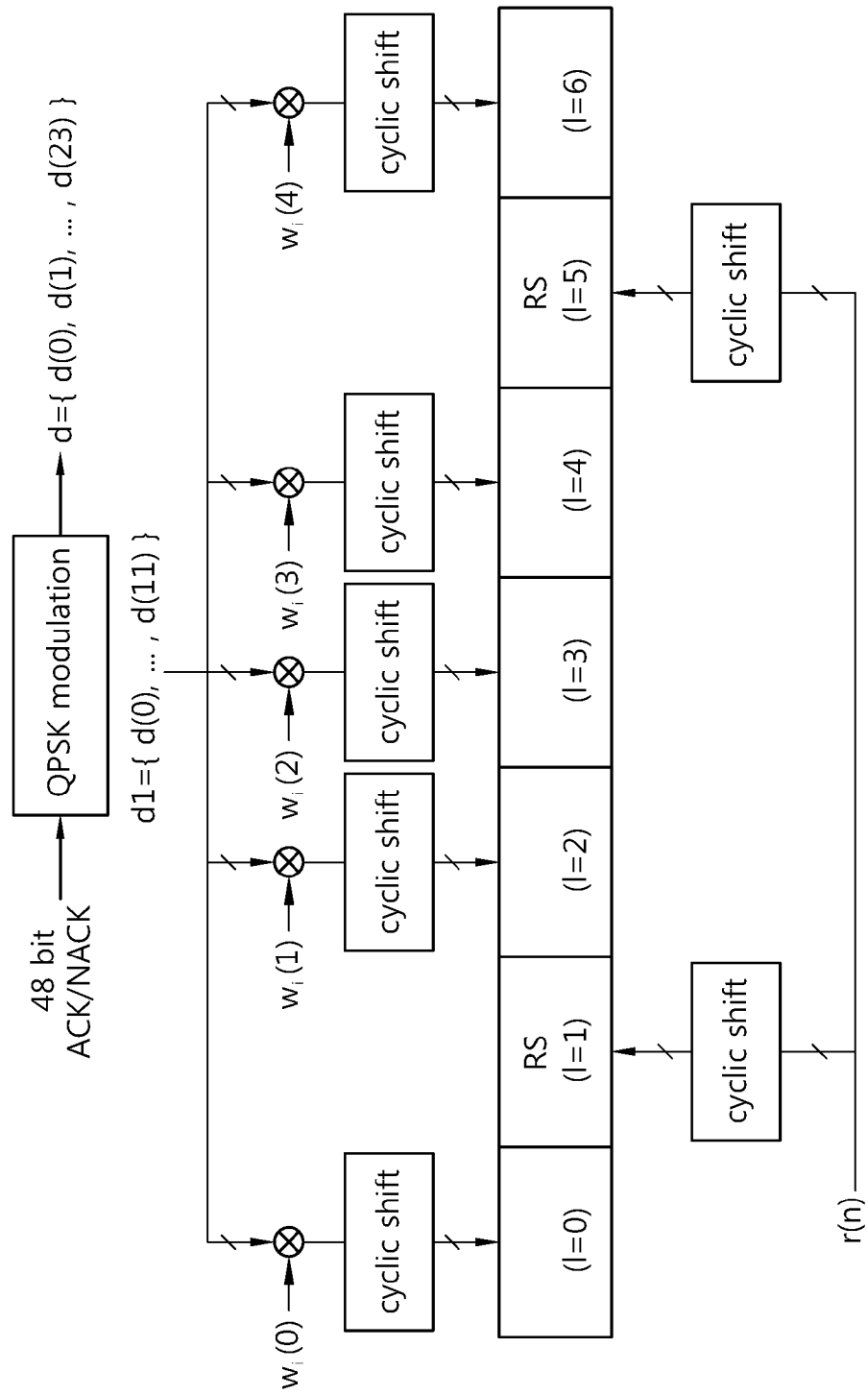
FIG. 12 is an exemplary diagram illustrating a structure of a PUCCH format 3 in a normal CP.

FIG. 12 is an exemplary diagram illustrating a structure of a PUCCH format 3 in a normal CP.

As the plurality of serving cells are used, PUCCH format 3 is additionally introduced in addition to the PUCCH format of the existing 3GPP LTE, against deficiency in the number of bits required to transmit the UCI.

One slot includes 7 OFDM symbols and 1 has values of 0 to 6 as OFDM symbol numbers in the slot. Two OFDM symbols in which l=1 and 5 becomes RS OFDM symbols for a reference signal and residual OFDM symbols become data OFDM symbols for a UCI signal.

48 encoded UCI (e.g., encoded ACK/NACK) is quadrature phase-shift keying (QPSK)-modulated to generate a symbol sequence d={ d(0), d(1), . . . , d(23)}. d(n)(n=0, 1, . . . , 23) is a complex-valued modulated symbol. The symbol sequence d may be an aggregation of modulated symbols. The number of bits or a modulation scheme of the UCI is just an example and the present invention is not limited thereto.

One PUCCH uses 1 RB and one subframe includes a first slot and a second slot. The symbol sequence d={d(0), d(1), . . . , d(23)} is divided into two sequences d1={d(0), . . . , d(11)} and d2={d(12), . . . , d(23)} which have a length of 12, and the first sequence d1 is transmitted in the first slot and the second sequence d2 is transmitted in the second slot. FIG. 4 illustrates that the first sequence d1 is transmitted in the first slot.

The symbol sequence is diffused to an orthogonal sequence wi. The symbol sequence corresponds to each data OFDM symbol and the orthogonal sequence is used to distinguish the PUCCH (alternatively, the UE) by diffusing the symbol sequence throughout the data OFDM symbols.

The orthogonal sequence has a diffusion coefficient of K=5 and includes 5 elements. As the orthogonal sequence, one of 5 orthogonal sequences of the following table may be selected according to an orthogonal sequence index i.

TABLE 6

| Index (i) | [ $w_i(0)$, $w_i(1)$, $w_i(2)$, $w_i(3)$, $w_i(4)$ ] |
| --- | --- |
| 0 | [ +1, +1, +1, +1, +1 ] |
| 1 | [ +1, $e^{j2\pi/5}$, $e^{j4\pi/5}$, $e^{j6\pi/5}$, $e^{j8\pi/5}$ ] |
| 2 | [ +1, $e^{j4\pi/5}$, $e^{j8\pi/5}$, $e^{j2\pi/5}$, $e^{j6\pi/5}$ ] |
| 3 | [ +1, $e^{j6\pi/5}$, $e^{j2\pi/5}$, $e^{j8\pi/5}$, $e^{j4\pi/5}$ ] |
| 4 | [ +1, $e^{j8\pi/5}$, $e^{j6\pi/5}$, $e^{j4\pi/5}$, $e^{j2\pi/5}$ ] |

Two slots in the subframe may use different orthogonal sequence indexes.

reference signal sequence used for demodulating the UCI is mapped and transmitted to two RS OFDM symbol.

Channel coding for PUCCH format 3 will be described below.

UCI (e.g., CSI) u0, u1, . . . , uA−1 (A represents the number of bits of the UCI) is channel-coded, and as a result, the encoded bit sequence q0, q1, . . . , qB−1 is generated. B represents the number of bits which may be transmitted by the corresponding PUCCH and since PUCCH format 3 may transmit 48-bit coded UCI, B=48.

PUCCH format 3 may transmit a maximum of 48 bits, but the channel coding uses a basis sequence for a (32, A) block code of Table 1. Accordingly, the channel coding is as follows by considering whether the number of UCI bits, A is larger than the number of RM bases (alternatively, also referred to as the basis sequence). According to Table 1, the number of RM bases is 11.

If A<=11, it is as follows.

An intermediate sequence for the channel coding, b0, b1, . . . , b31 is generated as follows.

$$b_i = \sum_{n=0}^{A-1} (u_n \cdot M_{i,n}) \bmod 2 \quad \text{[Equation 3]}$$

Where, i=0, 1, . . . , 31 and Mi,n represents a basis sequence for (32, 0) fo Table 1.

A control information bit sequence q0, q1, ..., qB−1 is generated by cyclically repeating the intermediate sequence b0, b1, ..., b31 as follows.

$$q_i = b_{(i \bmod 32)}$$ [Equation 4]

Where, i=0, 1, ..., B−1.

If 11<A<=21, it is as follows.

Two intermediate sequence b1i, b2i is generated as follows.

$$b_i^1 = \sum_{n=0}^{\lceil A/2 \rceil - 1} (u_n \cdot M_{i,n}) \bmod 2,$$

$$b_i^2 = \sum_{n=0}^{A - \lceil A/2 \rceil - 1} (u_{\lceil A/2 \rceil + n} \cdot M_{i,n}) \bmod 2$$ [Equation 5]

Where, i=0, 1, ..., 23.

The control information bit sequence q0, q1, ..., qB−1 is generated by concatenating the intermediate sequences as follows.

$$q_i = b_j^1, q_{i+1} = b_{j+1}^1, q_{i+2} = b_j^2, q_{i+4} = b_{j+1}^2$$ [Equation 6]

When A<=11, since one RM block code (alternatively, one RM encoder) is used, this is referred to as single RM. When A>11, since two RM block codes (alternatively, two RM encoders) are used, this is referred to as dual RM.

Transmission by the dual RM coding will be described below with reference to FIG. 13.

Figure 13:
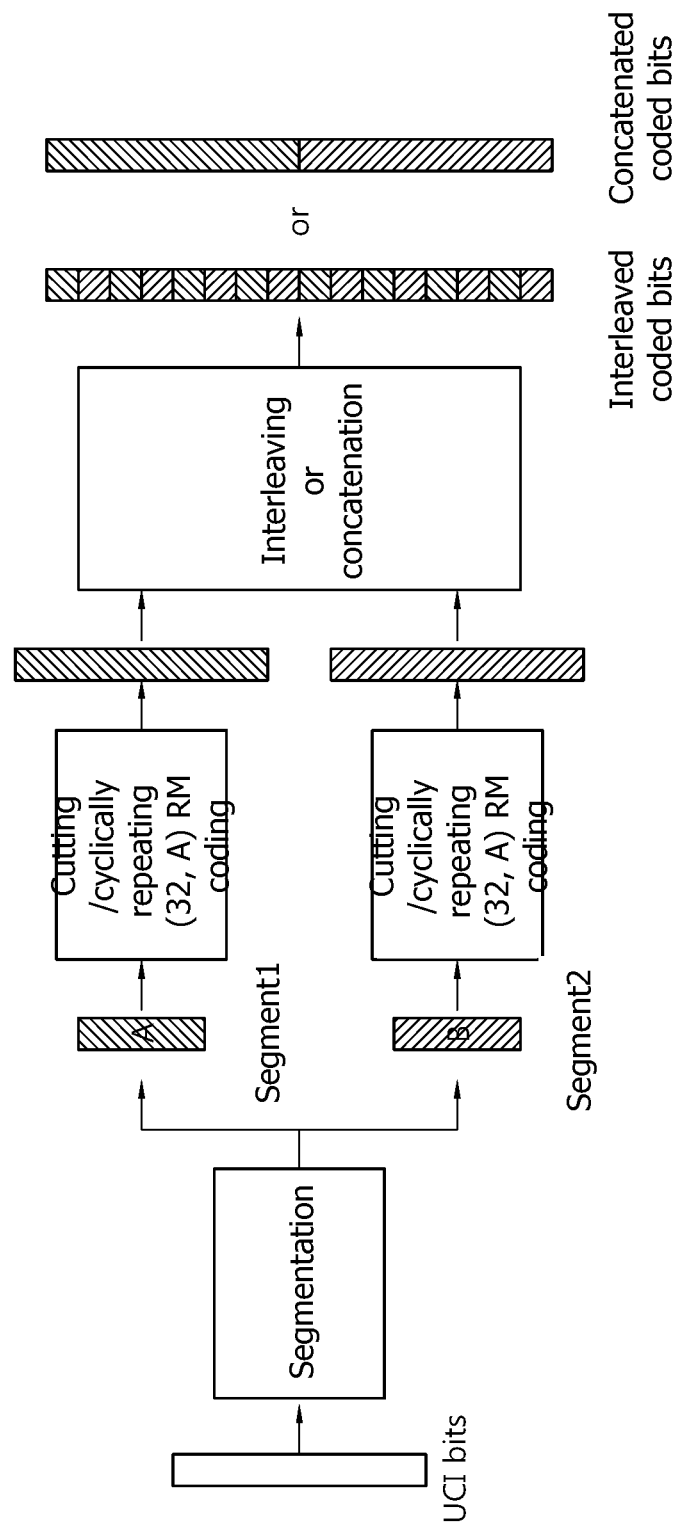
FIG. 13 exemplifies a dual RM coding process.

FIG. 13 exemplifies a dual RM coding process.

Referring to FIG. 13, when a UCI bit stream (information bits) is more than 11 bits, a bit stream (referred to as a segment) segmented through segmentation is generated. In this case, each of segment 1 and segment 2 becomes 11 bits or less. The segments 1 and 2 are interleaved or concatenated through the (32, A) RM code. Thereafter, the UCI bit stream is truncated or circularly repeated in order to match the coded bit number of the PUCCH format 3.

On the other hand, the UCI to be transmitted through the PUCCH resource is constituted by the HARQ-ACK for the plurality of cells in the subframe n which the PUCCH and the PUSCH are simultaneously transmitted. In this case, dual RM coding is used in order to transmit the PUCCH for the plurality of HARQ-ACKs. Similarly, the UCI is configured similarly to the condition that the simultaneous transmission of the PUCCH and the PUSCH is not configured in the subframe in which only the PUCCH is transmitted and the dual RM coding is used as the coding scheme.

In the fourth example, the UCI to be transmitted through the PUCCH resource is determined according to a state or a transmission type of the UCI or some information constituting the UCI in the subframe in which the PUCCH and the PUSCH are simultaneously transmitted. Herein, some information of the UCI may be limited to the CSI, the state of the information may be limited to the number of bits to be actually transmitted or the number of virtual transmission bits of the corresponding UCI, and the transmission type may be limited to the TDD or whether to transmit the CSI. Further, whether to transmit the CSI is based on the condition that the simultaneous transmission of the PUCCH and the PUSCH is not configured. The UE may make the CSI be included in the CSI to be transmitted through the PUCCH resource when the number of (actual or virtual) bits is smaller than a threshold which is previously designated or set in the high layer. The method for transmitting the PUCCH resource may be set similarly to the method for transmitting the PUCCH resource for the simultaneous transmission of the HARQ-ACK and the periodic CSI under the condition that simultaneous transmission of the PUCCH and the PUSCH is not configured and may be set to continuously operate in the dual RM coding regardless of inclusion of the CSI. In the subframe in which only the PUCCH is transmitted, the UCI is configured similarly to the condition that the simultaneous transmission of the PUCCH and the PUSCH is not configured and the coding scheme is set similarly to the subframe in which the PUCCH and the PUSCH are simultaneously transmitted.

In the above example, whether the plurality of HARQ-ACKs and the periodic CSI are simultaneously transmitted when the simultaneous transmission of the PUCCH and the PUSCH is configured may be set in the high layer. Further, a resource allocation method for each UCI may also be set in the high layer under the condition that the simultaneous transmission of the plurality of HARQ-ACK and the periodic CSI is permitted. Herein, the subframe in which only the PUCCH is transmitted includes even the case where the UE misses the UL grant.

Up to now, when the simultaneous transmission of the PUCCH and the PUSCH is configured, the simultaneous transmission of the plurality of HARQ-ACK information and periodic CSI information using the PUCCH resource may be configured not to be permitted.

Hereinafter, when the simultaneous transmission of the plurality of HARQ-ACK information and the periodic CSI information is configured to be enabled on the PUCCH while the simultaneous transmission of the PUCCH and the PUSCH is configured, a detailed example of the method for transmitting the UCI by using the PUSCH resource in the subframe in which the PUCCH and the PUSCH are simultaneously transmitted will be described.

In the first example, the UCI to be transmitted through the PUSCH resource includes UCI to be dropped under the condition that the simultaneous transmission of the PUCCH and the PUSCH is not configured. The UCI to be dropped may include all or some of periodic CSI for residual cells which are dropped at the time of selecting a periodic CSI report for the single cell for the simultaneous transmission of the HARQ-ACK ant the periodic CSI through the PUCCH resource under the condition that the simultaneous transmission of the PUCCH and the PUSCH is not configured. In respect to the case in which multiple periodic CSI transmission is permitted, the periodic CSI may be limited to periodic CSI reporting which becomes a target of the multiple periodic CSI transmission.

In the second example, the UCI to be transmitted through the PUSCH transmits all periodic CSI reports which may be transmitted without distinguishment of the periodic CSI transmitted through the PUCCH resource.

In the third example, the UCI to be transmitted through the PUSCH is constituted by only the periodic CSI report selected for the simultaneous transmission of the HARQ-ACK and the periodic CSI through the PUCCH resource under the condition that the simultaneous transmission o the PUCCH and the PUSCH is not configured.

Up to now, the methods for a subframe in which the aperiodic CSI is not transmitted have been described. Hereinafter, a method for a subframe in which the aperiodic CSI is transmitted will be described.

Method for Subframe in which Aperiodic CSI is Transmitted

When the simultaneous transmission of the PUCCH and the PUSCH is configured, aperiodic CSI through the PUCCH resource and (all or some) UCI through the PUCCH resource may be simultaneously transmitted. In the existing 3GPP release 10, when the aperiodic CSI and the periodic CSI collide with each other, the periodic CSI is dropped and only the aperiodic CSI is transmitted. However, the periodic CSI drop under the condition that the PUCCH and the PUSCH are simultaneously transmitted and the plurality of HARQ-ACKs and the periodic CSI are simultaneously transmitted causes the ambiguity for information constituting the UCI between the UE and the eNodeB and the total bit number, thereby degrading DL throughput performance.

Accordingly, when the simultaneous transmission of the PUCCH and the PUSCH is configured, the simultaneous transmission of the plurality of HARQ-ACK information and periodic CSI using the PUCCH resource may be enhanced not to be permitted.

Alternatively, unlike this, it may be enhanced so that the simultaneous transmission of the PUCCH and the PUSCH is permitted and the simultaneous transmission of the plurality of HARQ-ACKs and the periodic CSI on the PUCCH is enabled. When enhanced as described above, when the UE intends to simultaneously transmit the periodic CSI and the aperiodic CSI, the periodic CSI is dropped, the aperiodic CSI is transmitted through the PUSCH resource, and other UCI is transmitted through the PUCCH resource.

Detailed examples will be described below, for transmitting at least one of the HARQ-ACK, and the periodic CSI and the aperiodic CSI when it is enhanced so that the simultaneous transmission of the PUCCH and the PUSCH is permitted and the simultaneous transmission of the plurality of HARQ-ACKs and the periodic CSI on the PUCCH is enabled.

In the first example, the UCI to be transmitted through the PUCCH resource in the subframe in which the PUCCH and the PUSCH are simultaneously transmitted is configured similarly to the situation in which the simultaneous transmission of the PUCCH and the PUSCH is not configured. The first example is expressed by the drawing as illustrated in FIG. 12.

Figure 14:
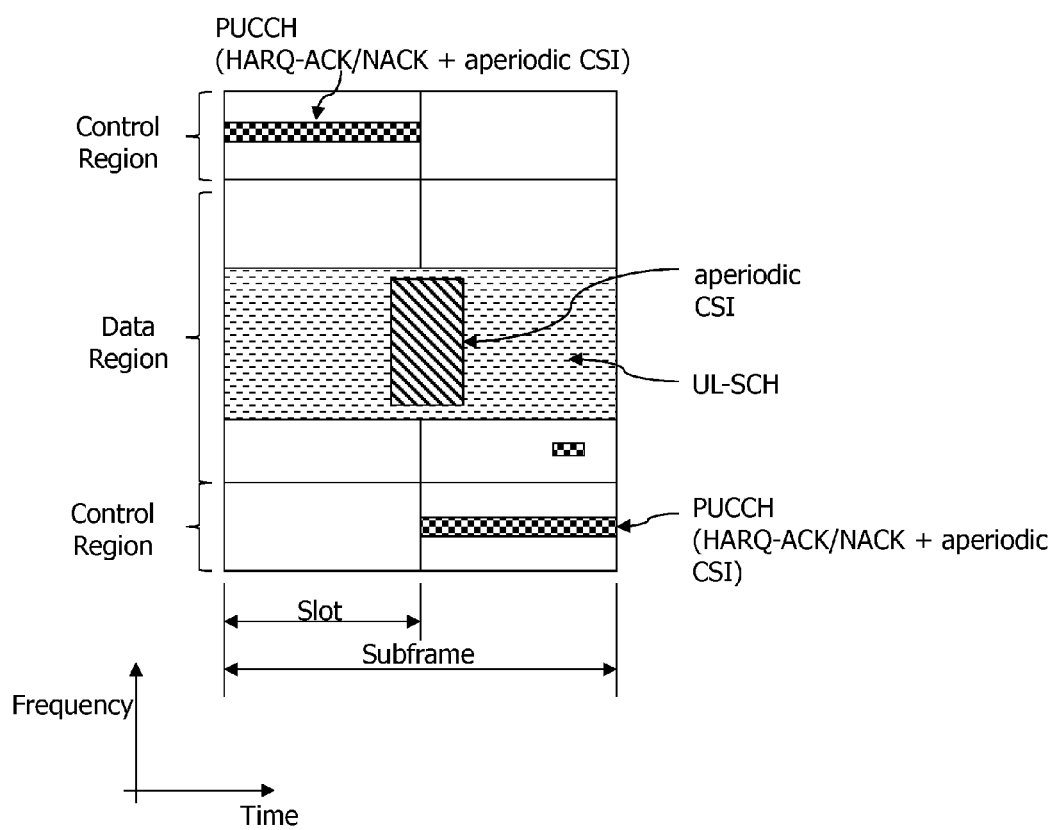
FIG. 14 is an exemplary diagram illustrating a configuration of the subframe where the PUCCH and the PUSCH are simultaneously transmitted according to an exemplary embodiment.

FIG. 14 is an exemplary diagram illustrating a configuration of the subframe where the PUCCH and the PUSCH are simultaneously transported according to an exemplary embodiment.

As known with reference to FIG. 14, UCI transmitted on the PUCH of the control region may include HARQ-ACK information for a plurality of cells and periodic CSI for a single cell. In addition, UCI to be transmitted through the PUSCH resource of the data region may include the aperiodic CSI.

Next, in the first example, the UCI to be transmitted through the PUCCH resource in the subframe in which the PUCCH and the PUSCH are simultaneously transmitted may include the plurality of HARQ-ACKs and the periodic CSI may be dropped. In this case, a method for transmitting the PUCCH is set similarly to the method for transmitting the PUCCH resource for the simultaneous transmission of the HARQ-ACK and the periodic CSI under the condition that the simultaneous transmission of the PUCCH and the PUSCH is not configured. Herein, selection of a coding scheme (single RM or dual RM coding) depending on the number of UCI bits is set similarly to the reference when the HARQ-ACK and the periodic CSI are simultaneously transmitted. In addition, the UCI to be transmitted through the PUSCH resource is constituted by the aperiodic CSI.

In the third example, the UCI to be transmitted through the PUCCH resource in the subframe in which the PUCCH and the PUSCH are simultaneously transmitted may include the plurality of HARQ-ACKs and the periodic CSI may be dropped. In this case, the dual RM coding may be used as a coding scheme for the PUCCH. Next, UCI to be transmitted through the PUSCH resource of the data region may include the aperiodic CSI. Even in the subframe in which only the PUCCH is transmitted, the dual RM coding may be used as the coding scheme.

In the above example, whether the plurality of HARQ-ACKs and the periodic CSI are simultaneously transmitted when the simultaneous transmission of the PUCCH and the PUSCH is configured may be set in the high layer. Further, a resource allocation method for each UCI may also be set in the high layer under the condition that the simultaneous transmission of the plurality of HARQ-ACK and the periodic CSI is permitted. Herein, the subframe in which only the PUCCH is transmitted includes the case where the UE misses the UL grant.

Up to now, the method for the subframe in which the aperiodic CSI is transmitted have been described. Hereinafter, a method for a subframe in which the periodic CSI for the plurality of cells is transmitted will be described.

Method for Subframe in which Periodic CSI for Multiple Cells is Transmitted

According to the exemplary embodiment of the present invention, it may be considered that the periodic CSI reports for the plurality of cells or the plurality of periodic CSI reports transmitted through the plurality of subframes are transmitted in the same subframe in order to prevent the DL throughput performance degradation which occurs due to a collision of the periodic CSI for the plurality of cells transmitted through the plurality of subframes or for utilization for enhanced Inter-Cell Interference Coordination (eICIC).

In this case, the PUCCH resource or the PUSCH resource may be considered as the available UL channel for transmitting the plurality of periodic CSI reports. In addition, when the PUCCH resource is considered, a modified format may be used so that the payload size increases in PUCCH format 2, PUCCH format 3, and PUCCH format 3. In addition, when the PUSCH resource is considered, the PUSCH having a format in which the period and the timing offset are high layer signaled or semi-statically set may be considered. The PUSCH transmitted with the period is designated as the periodic PUSCH. The periodic PUSCH is included in such a manner that the periodic CSI for the single or the plurality of cells is subjected to piggyback to the PUSCH.

UCI relocation and transmission method depending on a collision situation with the UL channel for the periodic CSI reports for the plurality of cells needs to be considered when the HARQ-ACKs and the periodic CSI for the plurality of cells are simultaneously transmitted through the PUCCH resource and an available method will be described below.

First, both the simultaneous transmission of the plurality of HARQ-ACKs and the periodic CSI in the same subframe and the simultaneous transmission of the plurality of periodic CSI may be configured not to be permitted to be enabled.

Alternatively, both simultaneous transmissions are permitted and in this case, some UCI may be dropped depending on the UL channel resource in which the plurality of periodic CSI is transmitted or the simultaneous transmission through the PUCCH and PUSCH resources may be set.

As described above, in the case where both simultaneous transmissions are enabled, the plurality of periodic CSI reports are transmitted through the PUCCH resource, the plurality of periodic CSI reports collide with the plurality of HARQ-ACKs and the periodic CSI through the PUCCH resourced in a subframe in which the PUSCH is not transmitted, the UE drops residual periodic CSI reports other than the periodic CSI report which is simultaneously transmitted in the same PUCCH resource as the HARQ-ACK. Next, in the case where two PUCCH resources collide with each other in the subframe in which the PUSCH is transmitted or the plurality of periodic CSI reports are transmitted through the periodic PUSCH resource, when the plurality of periodic CSI reports collide with the plurality of HARQ-ACKs and the periodic CSI through the PUCCH resource, a group UCI_1 is transmitted through the PUCCH and a group UCI_2 is transmitted through the PUSCH.

Hereinafter, a detailed example of a UCI selection method and a UCI transmission method constituting the group UCI_1 and the group UCI_2 in the subframe in which the periodic (alternatively, grant-based) PUSCH and PUCCH are simultaneously transmitted will be described.

As the first example, the group UCI_1 is configured similarly to the situation in which the simultaneous transmission of the PUCCH and the PUSCH is not configured. That is, The UCI may be constituted by HARQ-ACK information for a plurality of cells and periodic CSI for a single cell under the condition that the simultaneous transmission of the PUCCH and the PUSCH is not configured. Next, the group UCI_2 is constituted by all or some of a plurality of residual periodic CSI reports other than the periodic CSI report constituting the UCI_1.

As the second example, the group UCI_1 may be configured to include the plurality of HARQ-ACKs. In this case, a method for transmitting the PUCCH is set similarly to the method for transmitting the PUCCH resource for the simultaneous transmission of the HARQ-ACK and the periodic CSI under the condition that the simultaneous transmission of the PUCCH and the PUSCH is not configured. That is, selection of a coding scheme (single RM or dual RM coding) depending on the number of UCI bits for transmission is set similarly to the reference when the HARQ-ACK and the periodic CSI are simultaneously transmitted. Next, the group UCI_2 is constituted by the plurality of periodic CSI reports selected according to the same reference as the situation in which only the periodic PUSCH (alternatively, the PUCCH for transmitting the plurality of periodic CSI) is transmitted.

As the third example, the group UCI_1 may be configured to include the plurality of HARQ-ACKs. In this case, the PUCCH transmission is set similarly to transmission of the PUCCH resource for the plurality of HARQ-ACK information. That is, selection of a coding scheme (single RM or dual RM coding) depending on the number of UCI bits for transmission is set based on the HARQ-ACK. Next, the group UCI_2 may be configured to include the plurality of periodic CSI reports selected according to the same reference as the situation in which only the periodic PUSCH (alternatively, the PUCCH for transmitting the plurality of periodic CSI) is transmitted.

Accordingly, the eNodeB may know a subframe to be transmitted from the period and the timing offset of the periodic PUSCH similarly to the UE and a grant based PUSCH may be configured not to be transmitted through scheduling. However, when the eNodeB performs scheduling so that the grant based PUSCH is transmitted to the subframe to which the periodic PUSCH is to be transmitted, the UCI_2 may be subjected to piggyback to the grant based PUSCH.

Meanwhile, in order to prevent the ambiguity problem which may occur in the case where the UCI transmitted through the periodic PUSCH is dropped when the aperiodic CSI and the periodic PUSCH collide with each other, a mechanism regarding a collision between the UCIs when the grant based PUSCH and PUCCH are simultaneously transmitted as described in "Method for subframe in which aperiodic CSI is transmitted" may be followed.

The UCI location and the configuration of the transmission may be made through the high layer signal or semi-statically. The semi-static configuration may be achieved by setting the number of (actual or virtual) bits of the CSI for the case in which the simultaneous transmission of the PUCCH and the PUSCH as the parameter.

The periodic PUSCH for the plurality of periodic CSI reports may be limited to be transmitted only in the primary cell similarly to the PUCCH and configured to be transmitted through the secondary cell in order to reduce UL overhead of the primary cell. In this case, the secondary cell may be configured through the high layer signal or semi-statically. The secondary cell may be fixed to one specific cell.

Hereinafter, the case in which the UL channel for the plurality of periodic CSI is the periodic PUSCH will be described. In particular, detailed examples of the cell to which the periodic PUSCH is to be transmitted will be described.

As the first example, there is no limit for the cell to which the periodic PUSCH is to be transmitted and the eNodeB appropriately selects the cell to transmit the periodic PUSCH. The cell selected by eNodeB is transmitted to the UE through the high layer signal.

As the second example, the periodic PUSCH may be transmitted through the same cell as the PUCCH. Herein, the cell to which the PUCCH is transmitted may be limited to the primary cell.

As the third example, the cell to which the periodic PUSCH is transmitted may be configured to become a cell having a smallest secondary cell index.

As described above, even when the simultaneous transmission of the PUCCH and the PUSCH is configured, the simultaneous transmission of the plurality of HARQ-ACKs and the periodic CSI is permitted to thereby efficiently use the UL resource. Further, the ambiguity for the UCI configuration information and the number of bits between the UE and the eNodeB, which may occur by permitting the simultaneous transmission can be removed.

The exemplary embodiments of the present invention which has been described up to now may be implemented through various means. For example, the exemplary embodiments of the present invention may be implemented by hardware, firmware, software, or combinations thereof.

Figure 15:
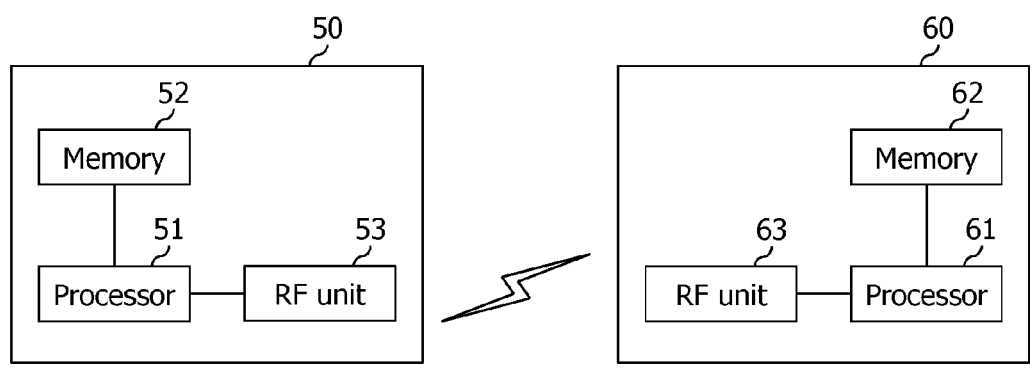
FIG. 15 is a block diagram illustrating a wireless communication system in which the exemplary embodiment of the present invention is implemented.

FIG. 15 is a block diagram illustrating a wireless communication system in which the exemplary embodiment of the present invention is implemented.

The base station 50 includes a processor 51, a memory 52, and a radio frequency (RF) unit 53. The memory 52 is connected with the processor 51 to store various information for driving the processor 51. The RF unit 53 is connected with the processor 51 to transport and/or receive a radio signal. The processor 51 implements a function, a process, and/or a method which are proposed. In the aforementioned embodiment, the operation of the base station may be implemented by the processor 51.

A wireless device 60 includes a processor 61, a memory 62, and an RF unit 63. The memory 62 is connected with the processor 61 to store various information for driving the processor 61. The RF unit 63 is connected with the processor 61 to transport and/or receive a radio signal. The processor 61 implements a function, a process, and/or a method which are proposed. In the aforementioned embodiment, the operation of the wireless device may be implemented by the processor 61.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for transmitting uplink control information (UCI) performed by user equipment in a wireless communication system, the method comprising:
   receiving downlink control information (DCI) having uplink resource allocation from a base station;
   determining, by the user equipment, whether to simultaneously transmit a hybrid automatic repeat request (HARQ) ACK/NACK on an uplink control channel of a subframe and channel state information (CSI) on an uplink shared channel of the subframe;
   when the simultaneous transmission is determined, adding, by the user equipment, additional bits to HARQ ACK/NACK bits, regardless of transmitting the CSI on the uplink shared channel, wherein the additional bits have a size corresponding to the number of the CSI bits;
   generating, by the user equipment, an encoded HARQ ACK/NACK by encoding the HARQ ACK/NACK bits in which the additional bits are added;
   generating, by the user equipment, a plurality of modulation symbols by modulating the encoded HARQ ACK/NACK; and
   transmitting, by the user equipment, the plurality of modulation symbols on the uplink control channel and transmitting the CSI on the uplink shared channel by using the uplink resource allocation in the subframe to the base station.

2. The method of claim 1, wherein the generating of the encoded HARQ ACK/NACK includes:
   generating the encoded HARQ ACK/NACK based on single RM when the number of the HARQ ACK/NACK bits is equal to or smaller than 11 bits; and
   generating the encoded HARQ ACK/NACK based on dual RM when the number of the HARQ ACK/NACK bits is larger than 11 bits.

3. The method of claim 1, wherein the modulation uses quadrature phase shift keying (QPSK).

4. The method of claim 1, wherein the additional bits include at least one of '1' or '0'.

5. The method of claim 1, wherein the uplink control channel is a physical uplink control channel (PUCCH).

6. The method of claim 5, wherein the transmission on the uplink control channel uses a PUCCH format 3.

7. The method of claim 1, wherein the uplink shared channel is a physical uplink shared channel (PUSCH).

8. The method of claim 1, wherein the uplink resource allocation triggers an aperiodic CSI report.

9. The method of claim 1, wherein the HARQ ACK/NACK is for a plurality of cells for carrier aggregation.

10. The method of claim 1, wherein the CSI is for a plurality of cells for carrier aggregation.

11. A wireless device for transmitting uplink control information in a wireless communication system, the device comprising:
   a radio frequency (RF) unit which transmits or receives a radio signal; and
   a processor connected with the RF unit,
   wherein the processor receives downlink control information (DCI) having uplink resource allocation from a base station through the RF unit;
   determines whether to simultaneously transmit a hybrid automatic repeat request (HARQ) ACK/NACK on an uplink control channel of a subframe and CSI on an uplink shared channel of the subframe;
   when the simultaneous transmission is determined, adding additional bits to HARQ ACK/NACK bits, regardless of transmitting the CSI on the uplink a shared channel, wherein the additional bits have a size corresponding to the number of the CSI bits;
   generate an encoded HARQ ACK/NACK by encoding the HARQ ACK/NACK bits in which the additional bits are added;
   generate a plurality of modulation symbols by modulating the encoded HARQ ACK/NACK; and
   transmit, through the RF unit, the plurality of modulation symbols on the uplink control channel and transmitting the CSI on the uplink shared channel by using the uplink resource allocation in the subframe to the base station.

12. The device of claim 11, wherein the generating of the encoded HARQ ACK/NACK includes:
   generating the encoded HARQ ACK/NACK based on single RM when the number of the HARQ ACK/NACK bits is equal to or smaller than 11 bits; and
   generating the encoded HARQ ACK/NACK based on dual RM when the number of the HARQ ACK/NACK bits is larger than 11 bits.

13. The device of claim 11, wherein the modulation uses quadrature phase shift keying (QPSK).

* * * * *